US012762711B2

(12) United States Patent
Buczkowski et al.

(10) Patent No.: US 12,762,711 B2
(45) Date of Patent: Oct. 13, 2026

(54) DATA NORMALIZATION OF AERIAL IMAGES

(71) Applicant: AI CLEARING INC., Austin, TX (US)

(72) Inventors: Aleksander Buczkowski, Warsaw (PL); Michal Mazur, Warsaw (PL); Adam Wisniewski, Warsaw (PL)

(73) Assignee: AI CLEARING INC., Austin, TX (US)

( * ) Notice: Subject to any disclaimer, the term of this patent is extended or adjusted under 35 U.S.C. 154(b) by 562 days.

(21) Appl. No.: 18/253,129

(22) PCT Filed: Nov. 16, 2021

(86) PCT No.: PCT/US2021/059512
§ 371 (c)(1),
(2) Date: May 16, 2023

(87) PCT Pub. No.: WO2022/104260
PCT Pub. Date: May 19, 2022

(65) Prior Publication Data
US 2024/0005599 A1 Jan. 4, 2024

(30) Foreign Application Priority Data
Nov. 16, 2020 (EP) .................................... 20207918
Nov. 16, 2020 (EP) .................................... 20207919

(51) Int. Cl.
*G06T 7/149* (2017.01)
*G06T 7/11* (2017.01)
(Continued)

(52) U.S. Cl.
CPC ................ *G06T 7/149* (2017.01); *G06T 7/11* (2017.01); *G06T 7/174* (2017.01); *G06T 7/75* (2017.01);
(Continued)

(58) Field of Classification Search
CPC .................... G06V 20/17; G06V 10/82; G06T 2207/10032; G06T 7/149; G06T 7/11;
(Continued)

(56) References Cited

U.S. PATENT DOCUMENTS 9,245,201 B1 * 1/2016 Jin .................... G06V 30/2504
9,389,084 B1 7/2016 Chen
(Continued)

OTHER PUBLICATIONS

International Search Report dated Mar. 10, 2022 for corresponding International Application No. PCT/US2021/059493.
(Continued)

*Primary Examiner* — Ming Y Hon
*Assistant Examiner* — Amanda H Pearson
(74) *Attorney, Agent, or Firm* — Tarolli, Sundheim, Covell & Tummino LLP

(57) ABSTRACT

A system configured for analysis of aerial images is disclosed. The system comprises a data-processing system. The data-processing system comprises a data-processing storage component, a segmentation component, a projection component and an error minimizing component. The data-storage component is configured for providing at least two input orthophoto maps. The segmentation component is configured for generating at least one or a plurality of polygon(s) for the at least two orthophoto maps relating to an area. Each polygon approximates a part of the corresponding input orthophoto map. The error minimizing component is configured for minimizing positional errors on at least one or a plurality of parts on the at least two orthophoto maps. Also, a computer-implemented method for transforming photogrammetric data is disclosed. The method comprises performing an input data providing step comprising providing at least two input orthophoto maps. The method also comprises performing a segmentation step. The segmentation step comprises generating at least one or a plurality of
(Continued)

rality of polygon(s) for the at least two orthophoto maps relating to an area. The method further comprises performing an error minimizing step on at least one or a plurality of parts on the at least two orthophoto maps. Further, a computer program product comprising instructions which, when the program is executed by a computer, cause the computer to carry out the steps of the method, is disclosed.

19 Claims, 9 Drawing Sheets

(51) Int. Cl.

| | |
|---|---|
| ***G06T 7/174*** | (2017.01) |
| ***G06T 7/73*** | (2017.01) |
| ***G06T 17/05*** | (2011.01) |
| ***G06V 10/776*** | (2022.01) |
| ***G06V 10/82*** | (2022.01) |
| ***G06V 20/17*** | (2022.01) |

(52) U.S. Cl.
CPC ............ *G06T 17/05* (2013.01); *G06V 10/776* (2022.01); *G06V 10/82* (2022.01); *G06V 20/17* (2022.01); *G06T 2207/10032* (2013.01); *G06T 2207/20021* (2013.01); *G06T 2207/20081* (2013.01); *G06T 2207/20084* (2013.01)

(58) Field of Classification Search
CPC . G06T 2207/20021; G06T 2207/20081; G06T 2207/20084; G06T 7/337
See application file for complete search history.

(56) References Cited

U.S. PATENT DOCUMENTS

| | | | | |
|---|---|---|---|---|
| 10,339,663 | B2 | 7/2019 | Barajas Hernandez | |
| 10,593,108 | B2 | 3/2020 | Barajas Hernandez | |
| 2002/0082942 | A1 | 6/2002 | Shimazu | |
| 2005/0031197 | A1 * | 2/2005 | Knopp | G01C 11/06 382/154 |
| 2011/0033110 | A1 | 2/2011 | Shimamura et al. | |
| 2017/0250751 | A1 * | 8/2017 | Kargieman | H04B 7/18513 |
| 2021/0150230 | A1 * | 5/2021 | Smolyanskiy | B60W 60/0011 |
| 2021/0304514 | A1 * | 9/2021 | Croxford | G06N 7/01 |

OTHER PUBLICATIONS

Krausse et al., "Extracting Orthogonal Building Objects in Urban Areas from High Resolution Stereo Satellite Image Pairs", (Sep. 1, 2007) pp. 1-6 http://elib.dlr.de/52632/1/krauss-PIA.pdf.

Reinzartz, et al., "Advances in DSM Generation and Higher Level Information Extraction from High Resolution Optical Stereo Satellite Data" Earsel Special Interest Group: 3D Remote Sensing & Urban Remote Sensing, (Jan. 1, 2014), pp. 1-9 https://elib.dlr.de/89701/1/Reinartz_3D-Earsel-SIG-3D-paper.pdf.

Giordan, et al., "The use of unmanned aerial vehicles (UAVs) for engineering geology applications", Bulletin of Engineering Geology and The Environment, vol. 79, No. 7 (Apr. 1, 2020), pp. 3437-3481 doi:10.1007/s10064-020-01766-2.

Cheng, et al. "Remote Sensing Image Scene Classification Meets Deep Learning: Challenges, Methods, Benchmarks, and Opportunities", IEEE Journal of Selected Topics in Applied Earth Observations and Remote Sensing, (Jun. 25, 2020), vol. 13, pp. 3735-3756 doi:10.1109/jstars.2020.3005403.

Pang, et al. (2016), "SGM-based seamline determination for urban orthophoto mosaicking" ISPRS Journal of Photogrammetry and Remote Sensing, 112, 1-12, (2016) doi:10.1016/j.isprsjprs.2015.11.0.

Xiang, et al. (2019). "Mini-Unmanned Aerial Vehicle-Based Remote Sensing: Techniques, applications, and prospects" IEEE Geoscience and Remote Sensing Magazine, vol. 7(3), pp. 29-63 doi:10.1109/mgrs.2019.2918840.

Hu, et al. "Classification of Very High-Resolution Remote Sensing Imagery Using a Fully Convolutional Network With Global and Local Context Information Enhancements" IEEE Access, vol. 8, pp. 14606-14619 (2020) doi.10.1109/ACCESS.2020.2964760.

"CS231n Colvolutional Neural Networks for Visual Recognition" Convolutional Neural Networks (CNNs/ConvNets) (2023), 23 pages https://cs231n.github.io/convolutional-networks/.

"CS231n Colvolutional Neural Networks for Visual Recognition: Introduction" Course website (2023), 12 pages https://cs231n.github.io/optimization-2/.

"CS231n Colvolutional Neural Networks for Visual Recognition: Learning" Course website (2023), 19 pages https://cs231n.github.io/neural-networks-3/.

Dos Santos, et al., "Deep Convolutional Neural Networks for Sentiment Analysis of Short Texts" (2014) Proceedings of COLING 2014, the 25th International Conference on Computational Linguistics: Technical Papers, pp. 69-78.

Buda, et al. "Deep Learning-Based Segementation of Nodules in Thyroid Ultrasound: Improving Performance by Utilizing Markers Present in the Images", Science Direct, Ultrasound in Medicine & Biology, (2020). vol. 46, issue 2, pp. 415-421.

Liu, et al. "Dense Dilated Convolutions Merging Network for Land Cover Classification" IEEE Transactions on Geoscience and Remote Sensing, (2020), 11 pages.

Bhatnagar, et al. "Drone Image Segmentation Using Machine and Deep Learning for Mapping Raised Bog Vegetation Communities", Remote Sensing (2020) vol. 12, 2602, 26 pages doi:10.3390/rs12162602.

Liu, et al., Efficient Patch-Wise Semantic Segmentation for Large Scale Remote Sensing Images, Sensors (2018) vol. 18(10), 3232, 36 pages.

Yang, et al., "End-to-End Learning of Deformable Mixture of Parts and Deep Convolutional Neural Networks for Human Pose Estimation" (2016) IEEE Conference on Computer Vision and Pattern Recognition (CVPR), 10 pages doi:10.1109/cvpr.2016.335.

ESRI Shapefile Technical Description, ESRI White Paper (Jul. 1998), 35 pages.

Zhou, et al., "Estimating Maize-Leaf Coverage in Field Conditions by Applying a Machine Learning Algorithm to UAV Remote Sensing Images", Applied Sciences (2019) vol. 9.2389, 18 pages doi:10.3390/app9112389.

Singh, et al., "EvalNorm: Estimating Batch Normalization Statistics for Evaluation" (2019) IEEE/CVF International Conference on Computer Vision (ICCV) 10.1109/iccv.2019.00373.

Poirson, et al., "Fast Single Shot Detection and Pose Estimation" (2016) Fourth International Conference on 3D Vision (3DV) doi:10.1109/3dv.2016.78.

Ren, et al., "Faster R-CNN: Towards Real-Time Object Detection with Region Proposal Networks", (2017) IEEE Transactions on Pattern Analysis and Machine Intelligence, 39(6), pp. 1137-1149 doi:10.1109/tpami.2016.2577031.

Reiterer, et al. (2020). Fully Automated Segmentation of 2D and 3D Mobile Mapping Data for Reliable Modeling of Surface Structures Using Deep Learning. Remote Sensing, vol. 12(16), 2530 doi:10.3390/rs12162530.

Shelhamer, et al., "Fully Convolutional Networks for Semantic Segmentation" (2017) IEEE Transactions on Pattern Analysis and Machine Intelligence, vol. 39(4), pp. 640-651 doi:10.1109/tpami.2016.2572683.

Chen, et al., "Fully Convolutional Neural Network with Augmented Atrous Spatial Pyramid Pool and Fully Connected Fusion Path for High Resolution Remote Sensing Image Segmentation" (2019) Applied Sciences vol. 9.9, 1816 doi:10.3390/app9091816.

Dang, et al., "Fusarium Wilt of Radish Detection Using RGB and Near Infrared Images from Unmanned Aerial Vehicles", (2020) Remote Sensing vol. 12.17, 2863 doi:10.3390/rs12172863.

Krizhevsky, et al., "ImageNet classification with deep convolutional neural networks" (2017) Communications of the ACM, vol. 60(6), pp. 84-90 doi:10.1145/3065386.

(56) References Cited

OTHER PUBLICATIONS

Mazzia, et al., "Improvement in Land Cover and Crop Classification based on Temporal Features Learning from Sentinel-2 Data Using Recurrent-Convolutional Neural Network (R-CNN)". (2019) Applied Sciences, vol. 10(1), 238, 23 pages doi:10.3390/app10010238.
"OpenGIS Web Map Tile Service Implementation Standard", OGC Making Location Count, (2021) https://www.ogc.org/standards/wmts.
Everingham, et al. "The 2005 PASCAL Visual Object Classes Challenge", First PASCAL Machine Learning Challenges Workshop (MLCW '05), (Apr. 2005), Southampton, United Kingdom. pp. 117-176, doi.10.1007/11736790_8.
Paszke, et al. "PyTorch: An Imperative Style, High-Performance Deep Learning Library" (2019) 33rd Conference on Neural Information Processing Systems, 12 pages.
Chen, et al., "Rethinking Atrous Convolution for Semantic Image Segmentation" (2017) Google Inc. 14 pages.
Zoph, et al., "Rethinking Pre-training and Self-training" (2020) 34th Conference on Neural Information Processing Systems, 13 pages.
Lukic, et al., "Speaker identification and clustering using convolutional neural networks" (2016) IEEE 26th International Workshop on Machine Learning for Signal Processing (MLSP), 6 pages doi:10.1109/mlsp.2016.7738816.
Rottensteiner, et al., "The ISPRS Benchmark on Urban Object Classification and 3D Building Reconstruction" (2012) ISPRS Annals of the Photogrammetry, Remote Sensing and Spatial Information Sciences, vol. 1-3, XXII ISPRS Congress.
Ronneberger, et al., "U-Net: Convolutional Networks for Biomedical Image Segmentation" (2015) Medical Image Computing and Computer-Assisted Intervention—MICCAI 234-241 doi:10.1007/978-3-319-24574-4_28.
Redmon, et al., "You Only Look Once: Unified, Real-Time Object Detection" (2016) IEEE Conference on Computer Vision and Pattern Recognition (CVPR), 10 pages doi:10.1109/cvpr.2016.91.
International Search Report dated Mar. 10, 2022 for corresponding International Application No. PCT/US2021/059512.
Billen, et al. "3D spatial relationships model: a useful concept for 3D cadastre?" (2003) Computers, Environment and Urban Systems, vol. 27(4), pp. 411-425 doi:10.1016/s0198-9715(02)00040-6.
Vu, et al. "A Hybrid Neural Network for Graph-Based Human Pose Estimation From 2D Images" (2020) IEEE Access, vol. 8, pp. 52830-52840 doi:10.1109/access.2020.2980565.
Xiong, et al. "An End-To-End Bayesian Segmentation Network Based on a Generative Adversarial Network for Remote Sensing Images" (2020) Remote Sensing, vol. 12, 216 doi:10.3390/rs12020216.
Peng, et al. "An Improved GrabCut Method Based on a Visual Attention Model for Rare-Earth Ore Mining Area Recognition with High-Resolution Remote Sensing Images", (2019) Remote Sensing, vol. 11,987 doi:10.3390/rs11080987.
Ahmadi, et al. "An Integrated Photogrammetric and Spatial Database Management System for Producing Fully Structured Data Using Aerial and Remote Sensing Images" (2009) Sensors, vol. 9(4), pp. 2320-2333 doi:10.3390/s90402320.
Huang, et al. "Automatic Mapping of Thermokarst Landforms from Remote Sensing Images Using Deep Learning: A Case Study in the Northeastern Tibetan Plateau" (2018) Remote Sensing, vol. 10, 2067 doi:10.3390/rs10122067.
Bokhovkin, et al. "Boundary Loss for Remote Sensing Imagery Semantic Segmentation" (2019) Advances in Neural Networks.
Maggiori, et al. "Can semantic labeling methods generalize to any city? the inria aerial image labeling benchmark" (2017) IEEE International Geoscience and Remote Sensing Symposium (IGARSS) doi:10.1109/igarss.2017.8127684.
"QGIS A Free Open Source Geographic Information System" https://qgis.org/en/site/.
"Occupation Employment and Wage Statistics" US Bureaus of Labor Statistics, https://www.bls.gov/oes/.

* cited by examiner

DATA NORMALIZATION OF AERIAL IMAGES

RELATED APPLICATIONS

The present application is a U.S. National Stage application under 35 USC 371 of PCT Application Serial No. PCT/US2021/059512, filed on 16 Nov. 2021, which claims priority to EP patent application No. 20207918.2, filed on 16 Nov. 2020, and EP patent application No. 20207919.0, filed on 16 Nov. 2020, the entirety of each of which is incorporated herein by reference.

The present invention relates to the field of image analysis and particularly to the field of aerial images. The present invention further relates to detecting and reducing positional errors of points on aerial images.

Over the last couple of decades there has been an increasing implementation of Unmanned Aerial Vehicles (UAVs) in several fields for capturing digital aerial images. Usage of UAVs has proven to be beneficial for numerous reasons: the operation of most UAVs requires little practical experience and creates relatively low costs compared to traditional manned aircraft. In addition, UAVs show a higher flexibility in movement and can perform trips in lower altitudes, allowing to record more detailed images of not easily accessible sites.

Moreover, UAVs are capable of capturing a large amount of high-quality aerial images that can then be processed to create high-resolution 3D maps.

Aerial images can for example be used for the analysis and progress-tracking of construction sites. In some cases, only a fraction of construction sites can be monitored manually, e.g. due to the size or the inaccessibility of the construction site. This may lead to inaccurate metrics, such as a total volume of earth moved on the site. Moreover, the accuracy of a manual survey is not easy to evaluate unless a second survey is conducted, thus requiring more resources.

Poor or slow surveillance may result in incomplete, unreliable or inaccurate reports of site progress. These may cause further problems, such as inefficient time scheduling or late detection of errors, such as earth-works performed at wrong positions.

Applying a UAV may help to overcome these problems.

Once aerial images are captured, they are commonly processed to orthophoto maps and digital elevation models. Orthophoto maps provide an orthogonal visualization of an area that allows to measure true distances, while a digital elevation model (DEM) is a 3D representation of the surface of an area and/or anthropogenic objects, wherein each pixel value contains information about the height of a point on the surface corresponding to the pixel.

One further step in image analysis is the process of georeferencing that relates an internal coordinate system of a digital image to geographic locations in physical space and thus determine the geographic position for points on the digital image. Georeferencing on aerial photogrammetry data is typically done using so called Ground Control Points (GCPs) which are characteristic points on the site, e.g. characteristic points of the site, such as corners of buildings, corners of horizontal street sights, or artificial markings. Coordinates of these points are either known or are determined. There are a number of algorithms that can use these points to interpolate the geographical position of all points of the digital image based on the geographical position of these points.

Despite the application of georeferencing, a plurality of images of the same site can reveal positioning errors for points of up to 30 cm (in x/y-direction, as well as for height). This means that either the entire image or portions of the image can positionally deviate, i.e. be shifted, rotated and/or tilted. In particular, portions of the image can be shifted, rotated and/or tilted with respect to each other.

In other words, the accuracy of positions associated with points in the digital images may be "locally changing" throughout an image, e.g. being higher towards Ground Control Points. For a number of analytical methods, such as for measuring the volumes and volume changes of objects on the site, a positional uncertainty is not desired and may present a barrier towards the use of photogrammetry data.

A known way of reducing positional uncertainties or deviations is to use a higher number of Ground Control Points for georeferencing. However, placing more GCPs comes with new challenges: in order to avoid image distortions, it is important for the user to find an even distribution of the GCPs over the entire construction site. Also, the geographical position of new GCPs must be determined with sufficient accuracy. This requires more efforts or resources, especially when the related projects involve large-scale construction sites.

The present invention seeks to overcome or at least alleviate the shortcomings and disadvantages of the prior art. More particularly, it is an object of the present invention to provide an improved method, system and computer program product for analysis of aerial images.

It is an optional object of the invention to provide a system and method for identifying locating elements in an area with an increased precision.

It is another optional object of the invention to provide a system and method for normalizing data of photogrammetry products. Particularly, it is an optional object of the present invention to allow for correcting positional deviations between points in at least two photogrammetry datasets.

In a first embodiment, a system comprising a data-processing system is disclosed. The data-processing system is configured for providing at least two input orthophoto maps ($O_1$, $O_2$) of an area and for providing at least two input digital elevation models ($DEM_1$, $DEM_2$) of the area. Further, the data processing system is configured for generating at least one or a plurality of polygon(s) based on the at least two input orthophoto maps ($O_1$, $O_2$). Each polygon approximates a part of the corresponding input orthophoto map. Moreover, the data processing system is configured for minimizing positional errors on at least one or a plurality of parts on the at least two orthophoto maps ($O_1$, $O_2$).

In the following, the term "polygon(s)" will be used together with the plural form of a verb for reasons of clarity and conciseness. However, these statements are intended to also cover at least one polygon.

Further, the data-processing system is configured for projecting the polygon(s) on the corresponding input digital elevation model(s) of the area.

The disclosed system may be optionally advantageous, as it may allow for automated detection of objects in the area, and for reliably assigning their borders with elevation coordinates.

Further, this may be optionally advantageous as it may allow for repeatable results for identical orthophoto maps and digital elevation models.

In this disclosure, the term "polygon" is intended to refer to a geometric shape comprising n vertexes and n edges, wherein the edges only intersect at the vertexes.

The person skilled in the art will easily understand that the polygon(s) which each approximate a part of the corresponding input orthophoto map may in other words be linear ring(s) or closed polygonal chain(s), and that the polygon(s) may be indicated for example by one or more triangles forming a polygon. Thus, the polygon(s) may for example be described as at least one or a plurality of neighboring triangles per polygon.

The term "object" is intended to refer to an object in the area. However, "object" may refer only to objects of interest, i.e. objects that are to be detected. For example, plain ground may not need to be detected or further classified. Objects that are no objects of interest may however be detected, e.g. as "background".

The objects may correspond to parts. The term "part" may to refer to a part of the area corresponding to an object or a portion thereof, e.g. when only a portion of an object is within the area, or when only a section of the area is processed or photographed, which section only comprises a portion of an object. The term "part" may also refer to a portion of an orthophoto map or a digital elevation model, which portion corresponds to an object in the area.

Whenever x-, y- and/or z-coordinates or directions are used within this disclosure, the z-direction may be vertical, in other words orthogonal to a ground surface. The x- and y-directions may be orthogonal to each other and to the z-direction, i.e. they may be horizontal directions. The coordinates may form a Cartesian coordinate system.

The at least two orthophoto maps ($O_1$, $O_2$) may also be referred to as orthomosaics or orthophotos. The at least two orthophoto maps may be generated based on at least two or more aerial images by means of photogrammetry. In other words, the at least two orthophoto maps may be generated by orthorectifying the two or more aerial images.

At least one of the digital elevation models ($DEM_1$ and/or $DEM_2$) may be at least one of a digital surface model ($DSM_1$ and/or $DSM_2$) and a digital terrain model ($DTM_1$ and/or $DTM_2$).

The data-processing system may comprise a data-storage component.

The data-storage component may be configured for providing at least one of image data and elevation data.

The data-storage component may be configured for providing the at least two input orthophoto maps ($O_1$, $O_2$) and the at least two input digital elevation models ($DEM_1$, $DEM_2$) of the area.

The data-processing system may comprise a segmentation component. The segmentation component may be configured for generating the polygon(s) for the at least two input orthophoto maps ($O_1$, $O_2$), wherein each polygon approximates a part of the respective input orthophoto map.

The data-processing system may comprise a projection component. The projection component may be configured for projecting the polygon(s) on the corresponding input digital elevation model(s) ($DEM_1$, $DEM_2$) of the area.

The data-processing system, particularly the projection component, may be configured for determining for each vertex of the corresponding polygon(s) at least one coordinate corresponding to the projection of vertices on the respective input digital elevation model, such as elevation coordinates of the vertices.

The data-processing system, particularly the projection component, may be configured for determining a reference value for each projection of the vertices for each polygon to the digital elevation models ($DEM_1$, $DEM_2$).

The reference value may correspond to a median, a minimum value or another estimation of the elevation coordinates of the projection of the vertices for each polygon of one of the digital elevation models ($DEM_1$, $DEM_2$).

Each part of the at least two orthophoto maps ($O_1$, $O_2$) may correspond to an object in the area.

The data-processing system may comprise an error minimizing component. The error minimizing component may be configured for minimizing the positional errors on at least one or a plurality of parts on the at least two orthophoto maps ($O_1$, $O_2$).

The data-processing system, particularly the error minimizing component, may be configured for applying a machine learning algorithm.

The error minimizing component, particularly the machine learning algorithm, may be configured for performing a nearest neighbour analysis step, wherein the nearest neighbour analysis step may comprise assigning to at least one object of one of the orthophoto maps ($O_1$ or $O_2$) a corresponding object of the same class in one of the other orthophoto maps ($O_2$ or $O_1$).

The error minimizing component may be configured for estimating the distance between a reference point, such as a centroid, of the at least one object of one of the orthophoto maps and reference points, such as centroids, of every object of the same class of the one of the other orthophoto maps.

The error minimizing component may further be configured for generating candidate matching pairs of objects of the at least two orthophoto maps ($O_1$, $O_2$) based on a similarity measure.

The similarity measure may refer to geometric similarities between the objects of the pairs, such as shape, size and dimensions.

The error minimizing component may further be configured for selecting a matching pair of objects of the same class of the at least two orthophoto maps ($O_1$, $O_2$), wherein the reference points of the objects of the matching pair have the smallest distance to each other.

The data-processing system, particularly the error minimizing component, may be configured for generating at least one or a plurality of alignment vector(s) for each pair of polygons of the at least two orthophoto maps ($O_1$, $O_2$).

At least one or a plurality of alignment vector(s) may indicate positional deviation(s) for pairs of parts of the at least two orthophoto maps ($O_1$, $O_2$), each part belonging to the respective orthophoto map, wherein a deviation may correspond to a translational and/or a rotational displacement.

A positional deviation may also be present locally; in other words, single portions of the orthophoto maps/digital elevation models may be rotated, translated or distorted with respect to each other.

Thus, in order to compare the at least two orthophoto maps $O_1$ and $O_2$ as well as the at least two digital elevation models $DEM_1$ and $DEM_2$, it may be optionally advantageous to normalize the images in order to associate same (physical) points in the area with same coordinates.

The data-processing system may further be configured for providing object-class data, wherein the object-class data may indicate at least one or a plurality of object-class(es).

The data-processing system, particularly the error minimizing component, may further be configured for determining a transformation for a plurality of pairs of corresponding parts of at least one of the indicated object-class(es) of the at least two orthophoto maps by means of an optimization algorithm.

The data-processing system may further comprise a transformation component.

The data-processing system, particularly the transformation component, may be configured for transforming at least one orthophoto map (such as $O_2$) and at least one digital elevation model (such as $DEM_2$) based on the transformation determined by the error minimizing step.

Thus, optionally advantageously, positional deviations can be detected and reduced.

The data-processing system, particularly the transformation component, may be configured for performing at least one of a linear transformation and an affine transformation.

The data-processing system, particularly the segmentation component, may be configured for generating the polygon(s) based on the at least two input orthophoto maps ($O_1$, $O_2$) and the at least two input digital elevation models ($DEM_1$, $DEM_2$).

The data-processing system may comprise a pre-processing component.

The data-processing system, particularly the pre-processing component, may be configured for generating tiles of the at least two input orthophoto maps ($O_1$, $O_2$) and the at least two digital elevation models ($DEM_1$, $DEM_2$).

The tiles may be overlapping in at least one direction, e.g. in the x- or in the y-direction.

The tiles may be overlapping in two directions, e.g. in the x- or in the y-direction.

The data-processing system, particularly the segmentation component, may be configured for determining classes for at least some of the part(s) of the at least two orthophoto maps ($O_1$, $O_2$) by means of at least one convolutional neural network. In other words, the data-processing system, particularly the segmentation component, may comprise at least one convolutional neural network configured for determining classes for at least some of the part(s) of the at least two orthophoto map ($O_1$, $O_2$).

Convolutional neural networks may comprise convolutional layers. In some cases, the convolutional layers may be computed by convolution of weights of neurons of the convolutional neural network over each input channel, also referred to as "depth slice". A set of weights of neurons of a convolutional layer is sometimes referred to as "filter".

As known in the art, the weights of the neural networks may be determined by training in order to minimize a loss function. The loss function in general terms may be an indicator for a divergence between labels or results generated by the network and correct data, e.g. labelled training data.

Further details relating to convolutional neural networks are for example discussed in "*Convolutional Neural Networks* (*CNNs/ConvNets*)", available at https://cs231n.github.io/convolutional-networks/(retrieved on 09.11.2020). This disclosure is incorporated herein by reference in its entirety.

For training convolutional neural networks, it is common to use backpropagation, as known in the art. Further details relating to backpropagation are for example discussed in "CS231n Convolutional Neural Networks for Visual Recognition—Introduction", available at https://cs231n.github.io/optimization-2/and "CS231n Convolutional Neural Networks for Visual Recognition—Learning", available at https://cs231n.github.io/neural-networks-3/ (both retrieved on 09.11.2020). These disclosures are incorporated herein by reference in their entirety.

The filters of convolutional neural networks may be trained, i.e. they "learn" the data automatically. Thus, a higher complexity and dimensionality is enabled.

Using a convolutional neural network may be optionally advantageous, as convolutional neural networks may be spatially invariant.

The data-processing system, particularly the segmentation component, may be configured for assigning different classes to different portions of the at least two orthophoto maps ($O_1$, $O_2$) by the at least one convolutional neural network. The portions may for example be pixels or voxels. They may however also comprise a plurality of pixels or be differently defined, e.g. as patches of 10×10 pixels or as portions of the area.

The data-processing system, particularly the segmentation component, may be configured for assigning portions comprising same classes to groups. For example, portions comprising a class "asphalt" may be assigned to at least one or a plurality of groups. The portions may be assigned to at most one or to at least one group respectively.

Assigning the portions comprising same classes to groups may be assigning connected portions comprising same classes to groups. In other words, groups may be composed of connected portions comprising same classes. "Connected" is intended to refer to neighbouring portions, as well as to portions connected to portions of a same class by portions comprising said same class.

Each group may correspond to a part of the corresponding orthophoto map.

The data-processing system, particularly the segmentation component, may be configured for may be configured for processing at least some of the tiles individually. This may be optionally advantageous, as it may allow the system to process orthophoto maps and/or digital elevation models that could not be processed as whole due to memory limitations.

The data-processing system, particularly the segmentation component, may be configured for merging results from processing of the tiles.

The data-processing system, particularly the segmentation component, may be configured for merging the classes assigned to same portions in different tiles by a merging operator. The merging operator may for example comprise a maximum operator, such as a point-wise or portion-wise maximum-operator.

The classes assigned to portions of the tiles within a pre-defined distance to a border of the respective tile may not be considered in the merging operator. Additionally, or alternatively, the classes assigned to portions of the tiles within a pre-defined distance to a border of the respective tile may be weighted lower in the merging operator.

In other words, the data-processing system, particularly the segmentation component, may be configured for are not considering and/or weighting lower the classes assigned to portions of the tiles within a pre-defined distance to a border of the respective tile in the merging operator.

This may be optionally advantageous so as to compensate for a lack of context, i.e. neighbouring objects, provided to the convolutional neural network next to borders of the tiles. The convolutional neural network may generate less reliable estimations in said portions. Thus, it may be optionally advantageous to use data generated for another tile, where a same geographical point is farer away from a border of said other tile and the convolutional neural network can thus access more context.

The data-processing system, particularly the segmentation component, may be configured for at least some tiles for,

- rotating the tiles;
- processing the rotated and the original tiles by means of the at least one convolutional network;
- for the results corresponding to the rotated tiles, inverting the rotation; and
- for each of the at least some tiles, merging the result of the original and the rotated tile.

The rotation may be at least one rotation. The rotation may comprise a plurality of rotations, e.g. around 90°, 180° and 270°.

Rotating the tiles and processing the tiles for each rotation may be optionally advantageous, as it provides more data for the convolutional neural network for assessment and may thus reduce an amount of non-detected classes or portions for which the class was not detected.

Rotating the tiles around 90° and/or multiples thereof may be optionally advantageous, as it may be implemented in a particularly resource efficient manner, e.g. by reordering pixels of an image, but without invoking multiplications or evaluations of cos- or sin-function.

The convolutional neural network may be trained with tiles comprising a lower resolution than the tiles processed by the data-processing system, particularly by the segmentation component. For example, the convolutional neural network may be obtained by training with tiles comprising image data corresponding to a bigger section of the area but a same number of pixels in comparison to the tiles processed by the semantic segmentation component.

In other words, the convolutional neural network may be trained with tiles comprising data corresponding to a bigger section of the area than the tiles processed in by the segmentation component (or the data-processing system), but however a same amount of data.

This may be optionally advantageous so as to train the convolutional neural network with more context and larger batches. The latter may optionally result in better approximations by batch normalization layers. The former may optionally result in better recognition of context-dependent objects. Both allow for better training results under a constraint of a limited amount of storage or allow for reduced use of memory.

The data-processing system may comprise a post-processing component.

The data-processing system, particularly the post-processing component, may be configured for discarding groups comprising an extent below a threshold.

The threshold may be pre-defined. The threshold may be specific to a class, so that there may be different thresholds for different classes. The data-processing system, particularly the post-processing component, may be configured for determining the threshold. The extent may be an extent of the horizontal surface corresponding to the respective group, but it may also be a number of pixels or portions of the orthophoto map and/or the digital elevation model corresponding to the group.

This may be optionally advantageous to remove artifacts and wrong classifications, e.g. single pixels or small pixel groups that are significantly smaller than objects/classes to be detected and which may thus be artifacts. Thresholds specific to classes may be optionally advantageous, as objects of different classes may have different possible sizes. For example, a plausible extent of a (erected) lantern may be significantly smaller than a plausible extent of a dump truck.

The data-processing system, particularly the post-processing component, may be configured for assigning a first class to a connected plurality of portions to which no class is assigned, if the connected plurality is enclosed by connected portions to which the first class is assigned.

The person skilled in the art will easily understand that instead of no class, the assigned class can be the "background"-class, as discussed above. Also, instead of no class, a class may be assigned to a group below the pre-defined threshold.

This may be optionally advantageous for removing classification artifacts of the convolutional neural network within an object. In other words, this may mean "filling holes" in detected objects, particularly in cases where the holes, i.e. the connected plurality of the portions without an assigned class, are too small to correspond to an object or a background section in the area.

The data-processing system, particularly the post-processing component, may be configured for assigning the first class to the connected plurality of portions to which no class is assigned only if the connected plurality is enclosed by connected portions to which the first class is assigned and if the extent of the connected plurality is below the threshold.

The threshold may comprise the above-discussed features.

This may be optionally advantageous, as objects that are enclosed by other objects may still be correctly identified, such as parts of concrete pipes whose section faces upwards and who enclose ground, or background or a heap of material in the middle of a roundabout.

The data-processing system, particularly the post-processing component, may be configured for applying a conditional random fields algorithm to the borders of the groups. This may be optionally advantageous for removing artifacts, e.g. miss-classified portions of the at least two orthophoto maps ($O_1$, $O_2$) and/or the at least two digital elevation models ($DEM_1$, $DEM_2$).

The data-processing system, particularly the segmentation component, may be configured for determining the polygon(s) based on the determined groups. The determined groups may be the groups by the post-processing component. In other words, the segmentation component may be configured for converting the class data from a raster format, e.g. pixels to which the classes are assigned, to vector data, e.g. the polygons.

The conversion to the vector data may be optionally advantageous for further processing, e.g. as vector data can be scaled without precision loss, and as vector data can be easier processed by GIS-systems or systems configured for processing GIS-data formats.

The data-processing system, particularly the post-processing component, may be configured for removing excessive vertices of the polygon(s). In other words, the data-processing system and/or the post-processing component may be configured for cleaning, denoising and/or generalizing vertices generated by the convolutional neural network.

The data-processing system may be configured for assigning at least 15, preferably at least 25 and still more preferably at least 30 different classes. The segmentation component may be configured for assigning at least 15, preferably at least 25 and still more preferably at least 30 different classes.

The portions may correspond to a surface of the area of at most 40 $cm^2$, preferably at most 20 $cm^2$, and still more preferably at most 10 $cm^2$. The surface may also be a surface corresponding to a pixel.

The input orthophoto map may comprise a sampling distance between 20 cm-0.5 cm, preferably at most 10 cm-1 cm, and still more preferably between 5 cm and 1 cm.

The system may be a system configured for analysis of aerial images.

The data-processing system may be configured for receiving aerial images from an aerial vehicle and/or satellite.

The aerial vehicle may be an unmanned aerial vehicle.

The aerial vehicle, particularly the unmanned aerial vehicle, may be configured for generating at least one of the orthophoto maps ($O_1$, $O_2$) based on the aerial images.

The aerial vehicle, particularly the unmanned aerial vehicle, may be configured for generating at least one of the digital elevation models ($DEM_1$, $DEM_2$) based on the aerial images.

At least two separate flights may be performed by the unmanned aerial vehicle, wherein at least one orthophoto map and a corresponding digital elevation model (such as $O_1$, $DEM_1$) may be generated based on the aerial images obtained during one of the flights.

The area may comprise a construction site.

The data-processing system, particularly the segmentation component, may be configured for detecting parts of the orthophoto maps that correspond to heap(s) of material and assigning corresponding classes thereto.

The heap(s) of material may comprise a heap of earth.

The heap(s) of material may correspond to a heap of sand.

The data-processing system, particularly the segmentation component, may be configured for detecting parts of the orthophoto maps that correspond to tree(s) and assigning corresponding classes thereto.

The data-processing system, particularly the segmentation component, may be configured for detecting parts of the orthophoto maps that correspond to roof(s) and assigning corresponding classes thereto.

The data-processing system, particularly the segmentation component, may be configured for detecting parts of the orthophoto maps that correspond to water and assigning corresponding classes thereto.

In a second embodiment, a method is disclosed. Definitions, details and advantages discussed above in the context of the system may apply respectively.

The method comprises performing the input providing step. The input providing step may comprise providing the at least two input orthophoto maps ($O_1$, $O_2$) of the area and providing at least two input digital elevation models ($DEM_1$, $DEM_2$) of the area. The method further comprises performing the segmentation step. The segmentation step comprises generating at least one or a plurality of polygon(s) for at least two orthophoto maps ($O_1$, $O_2$) relating to an area. Each polygon may approximate a part of the corresponding input orthophoto map. The method further comprises performing the error minimizing step on at least one or a plurality of parts on the at least two orthophoto maps ($O_1$, $O_2$).

The method may further comprise the projection step. The projection step may comprise projecting the polygon(s) on the corresponding input digital elevation model(s) of the area.

The projection step may further comprise determining for each vertex of the polygon(s) at least one coordinate corresponding to a projection of the respective vertex on the corresponding input digital elevation model, such as elevation coordinates of the vertices.

The method may further comprise determining a reference value for each projection of the vertices for each polygon to the digital elevation models ($DEM_1$, $DEM_2$).

The reference value may correspond preferably to a median, a minimum value or another estimation of the elevation coordinates of the projection of the vertices for each polygon of one of the digital elevation models ($DEM_1$, $DEM_2$).

Each part of the at least two orthophoto maps ($O_1$, $O_2$) may correspond to an object in the area.

The error minimizing step may comprise applying a machine learning algorithm.

The error minimizing step, particularly the machine learning algorithm, may comprise performing a nearest neighbour analysis step, wherein the nearest neighbour analysis step may comprise assigning to at least one object of one of the orthophoto maps ($O_1$ or $O_2$) a corresponding object of the same class in one of the other orthophoto maps ($O_2$ or $O_1$).

The nearest neighbour analysis step may further comprise estimating the distance between a reference point, such as a centroid, of the at least one object of one of the orthophoto maps and reference points, such as centroids, of every object of the same class of the one of the other orthophoto maps.

The nearest neighbour analysis step may also comprise generating candidate matching pairs of objects of the at least two orthophoto maps ($O_1$, $O_2$) based on a similarity measure.

The similarity measure may refer to geometric similarities between the objects of the pairs, such as shape, size and dimensions.

The nearest neighbour analysis step may further comprise selecting a matching pair of objects of the same class of the at least two orthophoto maps ($O_1$, $O_2$), wherein the reference points of the objects of the matching pair have the smallest distance to each other.

The error minimizing step may comprise generating at least one or a plurality of alignment vector(s) for each pair of polygons of the at least two orthophoto maps.

At least one or a plurality of alignment vector(s) may indicate positional deviation(s) for pairs of parts of the at least two orthophoto maps ($O_1$, $O_2$), each part belonging to the respective orthophoto map, wherein a deviation may correspond to a translational and/or a rotational displacement.

The method may further comprise providing object-class data, wherein the object-class data may indicate at least one or a plurality of object-class(es).

The error minimizing step may comprise determining a transformation for a plurality of pairs of corresponding parts of at least one of the indicated object-class(es) of the at least two orthophoto maps by means of an optimization algorithm.

The method may further comprise the transformation step. The transformation step may comprise transforming at least one orthophoto map (such as $O_2$) and at least one digital elevation model (such as $DEM_2$) based on the transformation determined by the error minimizing step.

The transformation step may comprise performing at least one of a linear transformation and an affine transformation.

The semantic segmentation step may comprise the pre-processing step.

The pre-processing step may comprise generating tiles of the at least two input orthophoto maps ($O_1$, $O_2$) and the at least two digital elevation models ($DEM_1$, $DEM_2$).

The tiles may be overlapping in at least one direction.

The tiles may be overlapping in two directions.

The segmentation step may comprise determining classes for at least some of the part(s) of the at least two orthophoto maps ($O_1$, $O_2$) by means of at least one convolutional neural network.

The segmentation step may comprise assigning different classes to different portions of the at least two orthophoto maps ($O_1$, $O_2$) by the at least one convolutional neural network. The portions may for example be pixels or image portions of the predetermined size, such as 10×10 pixels, as discussed above.

The segmentation step may comprise assigning portions comprising same classes to groups.

Assigning the portions comprising same classes to groups may be assigning connected portions comprising same classes to groups.

Each group may correspond to a part of the corresponding orthophoto map.

The method may comprise processing at least some tiles individually by means of the at least one convolutional neural network.

The segmentation step may comprise merging the results from processing of the tiles.

The segmentation step may comprise merging the classes assigned to same portions in different tiles by the merging operator, as discussed in the context of the system.

The classes assigned to portions of the tiles within a pre-defined distance to a border of the respective tile may not considered. Alternatively or additionally, they may be weighted lower in the merging operator.

The semantic segmentation step may comprise for at least some tiles, rotating the tiles and processing the rotated and the original tiles by means of the at least one convolutional network. Further, the semantic segmentation step may comprise the results corresponding to the rotated tiles, inverting the rotation, and for each of the at least some tiles, merging the result of the original and the rotated tile.

The semantic segmentation step may comprise for the at least some tiles rotating the tiles around different angles and performing the steps of the preceding paragraph. The merging may comprise merging the result of the original and the respective rotated tiles.

The convolutional neural network may be trained with tiles comprising a lower resolution than the tiles processed in the segmentation step. In other words, the tiles for training may comprise more context, as discussed in the context of the system.

The segmentation step may comprise the post-processing step.

The post-processing step may comprise discarding groups comprising the extent below the threshold. The threshold may be pre-defined.

The post-processing step may comprise for a connected plurality of portions to which no class is assigned, assigning a first class, if the connected plurality is enclosed by connected portions to which the first class is assigned. In other words, the post-processing step may comprise filling hole-like artefacts within a group comprising a same class, as discussed in the context of the system.

The post-processing step may comprise for the connected plurality of portions to which no class is assigned, assigning the first class, only if the connected plurality is enclosed by connected portions to which the first class is assigned and if the extent of the connected plurality is below the threshold.

The post-processing step may comprise applying a conditional random fields algorithm to the borders of the groups.

The segmentation step may comprise determining the polygon(s) based on the groups determined in the post-processing step.

The post-processing step may comprise removing excessive vertices of the polygon(s).

The segmentation step may comprise assigning at least 15, preferably at least 25 and still more preferably at least 30 different classes.

The portions may correspond to the surface of the area of at most 40 $cm^2$, preferably at most 20 $cm^2$, and still more preferably at most 10 $cm^2$.

The input orthophoto map may comprise a sampling distance between 20 cm-0.5 cm, preferably at most 10 cm-1 cm, and still more preferably between 5 cm and 1 cm.

The segmentation step, the projection step, the error minimizing step and the transformation step may be computer implemented.

The nearest neighbour analysis step may be computer implemented.

The method may be computer-implemented.

The method may be a method for analysis of aerial images.

The method may comprise receiving aerial images from an aerial vehicle and/or satellite.

The aerial vehicle may be an unmanned aerial vehicle.

The method may comprise generating at least one of the orthophoto maps ($O_1$, $O_2$) based on the aerial images.

The method may comprise generating at least one of the digital elevation models ($DEM_1$, $DEM_2$) based on the aerial images.

At least two separate flights may be performed by the unmanned aerial vehicle, wherein at least one orthophoto map and a corresponding digital elevation model (such as $O_1$, $DEM_1$) may be generated based on the aerial images obtained during one of the flights.

The area may comprise a construction site.

The segmentation step may comprise detecting parts of the orthophoto maps that are heap(s) of material and assigning corresponding classes thereto.

The heaps of material may comprise a heap of earth.

The heaps of material may comprise a heap of sand.

The segmentation step may comprise detecting parts of the orthophoto maps that correspond to tree(s) and assigning corresponding classes thereto.

The segmentation step may comprise detecting parts of the orthophoto maps that correspond to roof(s) and assigning corresponding classes thereto.

The segmentation step may comprise detecting parts of the orthophoto maps that correspond to water and assigning corresponding classes thereto.

The system may be configured for performing the method according to any of the preceding method embodiments.

In a third embodiment, a computer program product is disclosed.

A computer program product may comprise instructions which, when the program is executed by a computer, cause the computer to carry out the steps of the above-disclosed method.

Another computer program product may comprise instructions which, when the program is executed by the data-processing system, cause the data-processing system to perform the steps for which the data-processing system is configured.

The following embodiments also form part of the invention.

System Embodiments

Below, embodiments of a system will be discussed. The system embodiments are abbreviated by the letter "5" followed by a number. Whenever reference is herein made to the "system embodiments", these embodiments are meant.

S1. A system comprising a data-processing system (70), wherein the data-processing system is configured for

- providing at least two input orthophoto maps ($O_1$, $O_2$) relating to an area;
- providing at least two input digital elevation models ($DEM_1$, $DEM_2$) relating to the area;
- generating at least one or a plurality of polygon(s) (40*a*, 40*b*) for at least two orthophoto maps ($O_1$, $O_2$), each polygon approximating a part (30$a$, 30$b$) of the corresponding input orthophoto map;

minimizing positional errors on at least one or a plurality of parts (30$a$, 30$b$) on the at least two orthophoto maps ($O_1$, $O_2$).

S2. The system according to the preceding embodiment, wherein the data-processing system (70) comprises a data-storage component (72).

S3. The system according to the preceding embodiment, wherein the data-storage component (72) is configured for providing at least one of image data and elevation data.

S4. The system according to any of the two preceding embodiments, wherein the data-storage component (72) is configured for providing the at least two input orthophoto maps ($O_1$, $O_2$) and the at least two input digital elevation models ($DEM_1$, $DEM_2$) of the area (10).

S5. The system according to any of the preceding embodiments, wherein the data-processing system (70) comprises a segmentation component (74), and wherein the segmentation component (74) is configured for generating the polygon(s) (40$a$, 40$b$) for the at least two input orthophoto maps ($O_1$, $O_2$), each polygon (40$a$, 40$b$) approximating a part (30$a$, 30$b$) of the corresponding input orthophoto map ($O_1$, $O_2$).

S6. The system according to any of the preceding embodiments, wherein the data-processing system (70) comprises a projection component (76), wherein the projection component (76) is configured for projecting the polygon(s) (40$a$, 40$b$) on the corresponding input digital elevation model ($DEM_1$, $DEM_2$) of the area (10).

S7. The system according to any of the preceding embodiments, wherein the data-processing system (70), particularly the projection component (76), is configured for determining for each vertex (45$a$, 45$b$) of the corresponding polygon(s) (40$a$, 40$b$) at least one coordinate corresponding to the projection of vertices on the corresponding input digital elevation model ($DEM_1$, $DEM_2$), such as elevation coordinates of the vertices (45$a$, 45$b$).

S8. The system according to the preceding embodiment, wherein the data-processing system (70), particularly the projection component (76), is further configured for determining a reference value for each projection of the vertices (45$a$, 45$b$) for each polygon (40$a$, 40$b$) to the digital elevation models ($DEM_1$, $DEM_2$).

S9. The system according to the preceding embodiment, wherein the reference value corresponds preferably to a median, a minimum value or another estimation of the elevation coordinates of the projection of the vertices (45$a$, 45$b$) for each polygon (40$a$, of one of the digital elevation models ($DEM_1$, $DEM_2$).

S10. The system according to any of the preceding embodiments, wherein each part (30$a$, 30$b$) of the at least two orthophoto maps ($O_1$, $O_2$) corresponds to an object in the area (10).

S11. The system according to any of the preceding embodiments, wherein the data-processing system (70) comprises an error minimizing component (78), wherein the error minimizing component (78) is configured for minimizing the positional errors on at least one or a plurality of parts (30$a$, 30$b$) on the at least two orthophoto maps ($O_1$, $O_2$).

S12. The system according to any of the preceding embodiments, wherein the data-processing system (70), particularly the error minimizing component (78), is configured for applying a machine learning algorithm.

S13. The system according to any of the preceding embodiments, wherein the error minimizing component (78), particularly the machine learning algorithm, is configured for performing a nearest neighbour analysis step, wherein the nearest neighbour analysis step comprises assigning to at least one object of one of the orthophoto maps ($O_1$ or $O_2$) a corresponding object of the same class in one of the other orthophoto maps ($O_2$ or $O_1$).

S14. The system according to the preceding embodiment, wherein the error minimizing component (78) is further configured for estimating the distance between a reference point, such as a centroid, of the at least one object of one of the orthophoto maps and reference points, such as centroids, of every object of the same class of the one of the other orthophoto maps.

S15. The system according to any of the two preceding embodiments, wherein the error minimizing component (78) is configured for generating candidate matching pairs of objects of the at least two orthophoto maps ($O_1$, $O_2$) based on a similarity measure.

S16. The system according to the preceding embodiment, wherein the similarity measure refers to geometric similarities between the objects of the pairs, such as shape, size and dimensions.

S17. The system according to any of the two preceding embodiments, wherein the error minimizing component (78) is further configured for selecting a matching pair of objects of the same class of the at least two orthophoto maps ($O_1$, $O_2$), wherein the reference points of the objects of the matching pair have the smallest distance to each other.

S18. The system according to any of the preceding embodiments, wherein the data-processing system (70), particularly the error minimizing component (78), is configured for generating at least one or a plurality of alignment vector(s) for each pair of polygons (40$a$, 40$b$) of the at least two orthophoto maps ($O_1$, $O_2$).

S19. The system according to the preceding embodiment, wherein at least one or a plurality of alignment vector(s) indicate positional deviation(s) for pairs of parts (30$a$, 30$b$) of the at least two orthophoto maps ($O_1$, $O_2$), each part belonging to the respective orthophoto map, wherein a deviation corresponds to a translational and/or a rotational displacement.

S20. The system according to any of the preceding embodiments, wherein the data-processing system (70) is further configured for providing object-class data indicating at least one or a plurality of object-class(es).

S21. The system according to the preceding embodiment, wherein the data-processing system (70), particularly the error minimizing component (78), is further configured for determining a transformation for a plurality of pairs of corresponding parts of at least one of the indicated object-class(es) of the at least two orthophoto maps by means of an optimization algorithm.

S22. The system according to the preceding embodiment, wherein the data-processing system (70) further comprises a transformation component (80), wherein the transformation component is configured for transforming at least one orthophoto map (such as $O_2$) and at least one digital elevation model (such as $DEM_2$) based on the transformation determined by the error minimizing component (78).

S23. The system according to the preceding embodiment, wherein the transformation component is configured for performing at least one of a linear transformation and an affine transformation.

S24. The system according to any of the preceding embodiments, wherein the data-processing system (70), particularly the segmentation component (74), is configured for generating the polygon(s) (40$a$, 40$b$) based on the at least two input orthophoto maps (01, $O_2$) and the at least two input digital elevation models ($DEM_1$, $DEM_2$).

S25. The system according to any of the preceding embodiments, wherein the data-processing system (70) comprises a pre-processing component (82).

S26. The system according to any of the preceding embodiments with the features of S25, wherein the data-processing system (70), particularly the pre-processing component (82), is configured for generating tiles (50*a*, 50*b*) of the at least two input orthophoto maps ($O_1$, $O_2$) and the at least two digital elevation models ($DEM_1$, $DEM_2$).

S27. The system according to the preceding embodiment, wherein the tiles (50*a*, 50*b*) are overlapping in at least one direction.

S28. The system according to the preceding embodiment, wherein the tiles (50*a*, 50*b*) are overlapping in two directions.

S29. The system according to any of the preceding embodiments, wherein the data-processing system (70), particularly the segmentation component (74), is configured for determining classes for at least some of the part(s) (30*a*, 30*b*) of the at least two orthophoto maps ($O_1$, $O_2$) by means of at least one convolutional neural network.

S30. The system according to any of the preceding method embodiments, wherein the data-processing system (70), particularly the segmentation component (74), is configured for assigning different classes to different portions of the at least two orthophoto maps ($O_1$, $O_2$) by the at least one convolutional neural network.

S31. The system according to the preceding embodiment, wherein the data-processing system (70), particularly the segmentation component (74), is configured for assigning portions comprising same classes to groups.

S32. The system according to the preceding embodiment, wherein assigning the portions comprising same classes to groups is assigning connected portions comprising same classes to groups.

S33. The system according to any of the two preceding embodiments, wherein each group corresponds to a part (30*a*, 30*b*) of the corresponding orthophoto map ($O_1$, $O_2$).

S34. The system according to any of the preceding embodiments with the features of S30 and S26, wherein the data-processing system (70) is configured for processing at least some tiles individually by means of the at least one convolutional neural network.

S35. The system according to the preceding embodiment, wherein the data-processing system (70), particularly the segmentation component (74), is configured for merging results from processing of the tiles (50*a*, 50*b*).

S36. The system according to the preceding embodiment and with the features of at least one of S27 and S28, wherein the data-processing system (70), particularly the segmentation component (74), is configured for merging the classes assigned to same portions in different tiles (50*a*, 50*b*) by a merging operator.

S37. The system according to any of the preceding embodiments with the features of S34, wherein the classes assigned to portions of the tiles (50*a*, 50*b*) within a predefined distance to a border of the respective tile are not considered and/or weighted lower in the merging operator.

S38. The system according to any of the preceding embodiments with the features of S34, wherein the data-processing system (70), particularly the segmentation component (74), is configured for at least some tiles (50*a*, 50*b*) for, rotating the tiles;

processing the rotated and the original tiles by means of the at least one convolutional network;

for the results corresponding to the rotated tiles, inverting the rotation; and for each of the at least some tiles, merging the result of the original and the rotated tile.

S39. The method according to the preceding embodiment, wherein the data-processing system (70), particularly the segmentation component (74), is configured for the at least some tiles for rotating the tiles (50*a*, 50*b*) and performing the steps of S38, wherein the merging comprises merging the result of the original and the respective rotated tiles.

S40. The system according to the preceding embodiment and with the features of S39, wherein the rotational angle corresponds to 90 degrees.

S41. The system according to any of the preceding embodiments with the features of S30, wherein the data-processing system (80) comprises a post-processing component (84).

S42. The system according to any of the preceding embodiments with the features of S30, wherein the data-processing system (80), particularly the post-processing component (84), is configured for discarding groups comprising an extent below a threshold.

S43. The system according to any of the preceding embodiments with the features of S30, wherein the data-processing system (80), particularly the post-processing component (84), is configured for assigning a first class to a connected plurality of portions to which no class is assigned, if the connected plurality is enclosed by connected portions to which the first class is assigned.

S44. The system according to the preceding embodiment, wherein the data-processing system (80), particularly the post-processing component (84), is configured for only assigning the first class to the connected plurality of portions to which no class is assigned, if the connected plurality is enclosed by connected portions to which the first class is assigned and if the extent of the connected plurality is below the threshold.

S45. The system according to any of the preceding embodiments with the features of S30, wherein the data-processing system (80), particularly the post-processing component (84), is configured for applying a conditional random fields algorithm to the borders of the groups.

S46. The system according to any of the preceding embodiments with the features of S42, wherein data-processing system (70), particularly the segmentation component (74), is configured for determining the polygon(s) based on the determined groups, such as the groups determined by the post-processing component.

S47. The system according to the preceding embodiment and with the features of S43, wherein the data-processing system (70), particularly the post-processing component (84), is configured for removing excessive vertices of the polygon(s).

S48. The system according to any of the preceding embodiments with the features of S30, wherein the data-processing system (70), particularly the segmentation component (74), is configured for assigning at least 15, preferably at least 25 and still more preferably at least 30 different classes.

S49. The system according to any of the preceding embodiments with the features of S30, wherein the data-processing system (70) is configured for processing portions corresponding to a surface of the area (10) of at most 40 $cm^2$, preferably at most 20 $cm^2$, and still more preferably at most 10 $cm^2$.

S50. The system according to any of the preceding embodiments, wherein the input orthophoto map comprises a sampling distance between 20 cm-0.5 cm, preferably at most 10 cm-1 cm, and still more preferably between 5 cm and 1 cm.

S51. The system according to any of the preceding system embodiments, wherein the system is a system configured for analysis of aerial images.

S52. The system according to any of the preceding system embodiments, wherein the data-processing system (70) is configured for receiving aerial images from an aerial vehicle and/or satellite.

S53. The system according to the preceding embodiment, wherein the aerial vehicle is an unmanned aerial vehicle (60).

S54. The system according to any of the preceding embodiments, wherein the system comprises the aerial vehicle, preferably the unmanned aerial vehicle (60), and wherein the aerial vehicle, preferably the unmanned aerial vehicle (60), is configured for generating at least one of the orthophoto maps ($O_1$, $O_2$) based on the aerial images.

S55. The system according to any of the preceding embodiments, wherein the aerial vehicle, preferably the unmanned aerial vehicle (60), is configured for generating at least one of the digital elevation models ($DEM_1$, $DEM_2$) based on the aerial images.

S56. The system according to any of the preceding embodiments, wherein at least two separate flights are performed by the unmanned aerial vehicle (60), wherein at least one orthophoto map and a corresponding digital elevation model (such as $O_1$, $DEM_1$) are generated based on the aerial images obtained during one of the flights.

S57. The system according to any of the preceding embodiments, wherein the area (10) comprises a construction site.

S58. The system according to any of the preceding embodiments, wherein the data-processing system (70), particularly the segmentation component (74), is configured for detecting parts of the orthophoto maps that correspond to heap(s) of material and assigning corresponding classes thereto.

S59. The system according to any of the preceding system embodiments with the features of S58, wherein the heap(s) of material comprise a heap of earth.

S60. The system according to any of the preceding system embodiments with the features of S58, wherein the heap(s) of material comprise a heap of sand.

S61. The system according to any of the preceding embodiments, wherein the data-processing system (70), particularly the segmentation component (74), is configured for detecting parts of the orthophoto maps that correspond to tree(s) and assigning corresponding classes thereto.

S62. The system according to any of the preceding embodiments, wherein the data-processing system (70), particularly the segmentation component (74), is configured for detecting parts of the orthophoto maps that correspond to roof(s) and assigning corresponding classes thereto.

S63. The system according to any of the preceding embodiments, wherein the data-processing system (70), particularly the segmentation component (74), is configured for detecting parts of the orthophoto maps that correspond to water and assigning corresponding classes thereto.

Method Embodiments

Below, embodiments of a method will be discussed. The method embodiments are abbreviated by the letter "M" followed by a number. Whenever reference is herein made to the "method embodiments", these embodiments are meant.

M1. A method for transforming photogrammetric data, comprising:

- performing an input data providing step;
- performing a segmentation step, wherein the segmentation step comprises generating at least one or a plurality of polygon(s) (40*a*, 40*b*) for at least two orthophoto maps ($O_1$, $O_2$) relating to an area;
- performing an error minimizing step on at least one or a plurality of parts (30*a*, on the at least two orthophoto maps ($O_1$, $O_2$);

M2. The method according to the preceding embodiment, wherein the input data providing step comprises providing the at least two input orthophoto maps ($O_1$, $O_2$).

M3. The method according to any of the preceding embodiments, wherein the input data providing step comprises providing at least two input digital elevation models ($DEM_1$, $DEM_2$).

M4. The method according to any of the preceding embodiments, wherein each polygon is delimiting a part of one of the input orthophoto maps ($O_1$, $O_2$).

M5. The method according to any of the preceding embodiments, wherein the method further comprises a projection step, wherein the projection step comprises projecting the polygon(s) (40*a*, 40*b*) on the corresponding input digital elevation model(s) of the area.

M6. The method according to the preceding embodiment, wherein the projection step comprises determining for each vertex (45*a*, 45*b*) of the polygon(s) (40*a*, 40*b*) at least one coordinate corresponding to a projection of the respective vertex on the corresponding input digital elevation model, such as elevation coordinates of the vertices.

M7. The method according to the preceding embodiment, wherein the method further comprises determining a reference value for each projection of the vertices (45*a*, 45*b*) for each polygon (40*a*, 40*b*) to the digital elevation models ($DEM_1$, $DEM_2$).

M8. The method according to the preceding embodiment, wherein the reference value corresponds preferably to a median, a minimum value or another estimation of the elevation coordinates of the projection of the vertices (45*a*, 45*b*) for each polygon (40*a*, of one of the digital elevation models ($DEM_1$, $DEM_2$).

M9. The method according to any of the preceding embodiments, wherein each part (30*a*, 30*b*) of the at least two orthophoto maps ($O_1$, $O_2$) corresponds to an object in the area.

M10. The method according to any of the preceding embodiments, wherein the error minimizing step comprises applying a machine learning algorithm.

M11. The method according to any of the preceding embodiments, wherein the error minimizing step, particularly the machine learning algorithm, comprises performing a nearest neighbour analysis step, wherein the nearest neighbour analysis step comprises assigning to at least one object of one of the orthophoto maps ($O_1$ or $O_2$) a corresponding object of the same class in one of the other orthophoto maps ($O_2$ or $O_1$).

M12. The method according to the preceding embodiment, wherein the nearest neighbour analysis step further comprises estimating the distance between a reference point, such as a centroid, of the at least one object of one of the orthophoto maps and reference points, such as centroids, of every object of the same class of the one of the other orthophoto maps.

M13. The method according to any of the two preceding embodiments, wherein the nearest neighbour analysis step comprises generating candidate matching pairs of objects of the at least two orthophoto maps ($O_1$, $O_2$) based on a similarity measure.

M14. The method according to the preceding embodiment, wherein the similarity measure refers to geometric similarities between the objects of the pairs, such as shape, size and dimensions.

M15. The method according to any of the two preceding embodiments, wherein the nearest neighbour analysis step further comprises selecting a matching pair of objects of the same class of the at least two orthophoto maps ($O_1$, $O_2$), wherein the reference points of the objects of the matching pair have the smallest distance to each other.

M16. The method according to any of the preceding embodiments, wherein the error minimizing step comprises generating at least one or a plurality of alignment vector(s) for each pair of polygons of the at least two orthophoto maps.

M17. The method according to the preceding embodiment, wherein at least one or a plurality of alignment vector(s) indicate positional deviation(s) for pairs of parts of the at least two orthophoto maps ($O_1$, $O_2$), each part belonging to the respective orthophoto map, wherein a deviation corresponds to a translational and/or a rotational displacement.

M18. The method according to any of the preceding embodiments, wherein the method further comprises providing object-class data indicating at least one or a plurality of object-class(es), and wherein the error minimizing step comprises determining a transformation for a plurality of pairs of corresponding parts of at least one of the indicated object-class(es) of the at least two orthophoto maps ($O_1$, $O_2$) by means of an optimization algorithm.

M19. The method according to the preceding embodiment, wherein the method further comprises a transformation step, wherein the transformation step comprises transforming at least one orthophoto map (such as $O_2$) and at least one digital elevation model (such as $DEM_2$) based on the transformation determined by the error minimizing step.

M20. The method according to the preceding embodiment, wherein the transformation step comprises performing at least one of a linear transformation and an affine transformation.

M21. The method according to any of the preceding method embodiments, wherein the semantic segmentation step comprises a pre-processing step.

M22. The method according to any of the preceding embodiments with the features of M21, wherein the pre-processing step comprises generating tiles (50*a*, 50*b*) of the at least two input orthophoto maps ($O_1$, $O_2$) and the at least two digital elevation models ($DEM_1$, $DEM_2$).

M23. The method according to the preceding embodiment, wherein the tiles (50*a*, 50*b*) are overlapping in at least one direction.

M24. The method according to the preceding embodiment, wherein the tiles (50*a*, 50*b*) are overlapping in two directions.

M25. The method according to any of the preceding method embodiments, wherein the segmentation step comprises determining classes for at least some of the part(s) (30*a*, 30*b*) of the at least two orthophoto maps ($O_1$, $O_2$) by means of at least one convolutional neural network.

M26. The method according to any of the preceding method embodiments, wherein the segmentation step comprises assigning different classes to different portions of the at least two orthophoto maps ($O_1$, $O_2$) by the at least one convolutional neural network.

M27. The method according to the preceding embodiment, wherein the segmentation step comprises assigning portions comprising same classes to groups.

M28. The method according to the preceding embodiment, wherein assigning the portions comprising same classes to groups is assigning connected portions comprising same classes to groups.

M29. The method according to any of the two preceding embodiments, wherein each group corresponds to a part of the corresponding orthophoto map.

M30. The method according to any of the preceding embodiments with the features of M26 and M22, wherein the method comprises processing at least some tiles (50*a*, 50*b*) individually by means of the at least one convolutional neural network.

M31. The method according to the preceding embodiment, wherein the method comprises merging results from processing of the tiles (50*a*, 50*b*).

M32. The method according to the preceding embodiment and with the features of at least one of M23 and M24, wherein the method comprises merging the classes assigned to same portions in different tiles (50*a*, 50*b*) by a merging operator.

M33. The method according to any of the preceding embodiments with the features of M30, wherein the classes assigned to portions of the tiles (50*a*, 50*b*) within a predefined distance to a border of the respective tile are not considered and/or weighted lower in the merging operator.

M34. The method according to any of the preceding embodiments with the features of M30, wherein the semantic segmentation step comprises for at least some tiles (50*a*, 50*b*), rotating the tiles;

processing the rotated and the original tiles by means of the at least one convolutional network;

for the results corresponding to the rotated tiles, inverting the rotation; and for each of the at least some tiles, merging the result of the original and the rotated tile.

M35. The method according to the preceding embodiment, wherein the semantic segmentation step comprises for the at least some tiles (50*a*, 50*b*) rotating the tiles and performing the steps of M34, wherein the merging comprises merging the result of the original and the respective rotated tiles.

M36. The method according to the preceding embodiment and with the features of M35, wherein the rotational angle corresponds to 90 degrees.

M37. The method according to any of the preceding method embodiments with the features of M26, wherein the segmentation step comprises a post-processing step.

M38. The method according to the preceding embodiment, wherein the post-processing step comprises discarding groups comprising an extent below a threshold.

M39. The method according to any of the two preceding embodiments, wherein the post-processing step comprises for a connected plurality of portions to which no class is assigned, assigning a first class, if the connected plurality is enclosed by connected portions to which the first class is assigned.

M40. The method according to the preceding embodiment, wherein the post-processing step comprises for the connected plurality of portions to which no class is assigned, assigning the first class, only if the connected plurality is enclosed by connected portions to which the first class is assigned and if the extent of the connected plurality is below the threshold.

M41. The method according to any of the preceding method embodiments with the features of M37, wherein the post-processing step comprises applying a conditional random fields algorithm to the borders of the groups.

M42. The method according to any of the four preceding embodiments and with the features of M9, wherein the segmentation step comprises determining the polygon(s) (40*a*, 40*b*) based on the groups determined in the post-processing step.

M43. The method according to the preceding embodiment and with the features of M38, wherein the post-processing step comprises removing excessive vertices (45*a*, 45*b*) of the polygon(s) (40*a*, 40*b*).

M44. The method according to any of the preceding embodiments with the features of M26, wherein the segmentation step comprises assigning at least 15, preferably at least 25 and still more preferably at least 30 different classes.

M45. The method according to any of the preceding embodiments with the features of M26, wherein the portions correspond to a surface of the area (10) of at most 40 $cm^2$, preferably at most 20 $cm^2$, and still more preferably at most 10 $cm^2$.

M46. The method according to any of the preceding embodiments, wherein the input orthophoto map comprises a sampling distance between 20 cm-0.5 cm, preferably at most 10 cm-1 cm, and still more preferably between 5 cm and 1 cm.

M47. The method according to any of the preceding method embodiments, wherein the segmentation step, the projection step, the error minimizing step and the transformation step are computer implemented.

M48. The method according to any of the preceding method embodiments with the features of M11, wherein the nearest neighbour analysis step is computer implemented.

M47. The method according to any of the preceding method embodiments, wherein the method is a method for analysis of aerial images.

M48. The method according to any of the preceding method embodiments, wherein the method comprises receiving aerial images from an aerial vehicle and/or satellite.

M49. The method according to any of the preceding embodiments, wherein the aerial vehicle is an unmanned aerial vehicle (60).

M50. The method according to any of the three preceding embodiments, wherein the method comprises generating at least one of the orthophoto maps ($O_1$, $O_2$) based on the aerial images.

M51. The method according to any of the preceding embodiments with the features of M47 and M3, wherein the method comprises generating at least one of the digital elevation models ($DEM_1$, $DEM_2$) based on the aerial images.

M52. The method according to any of the preceding embodiments, wherein at least two separate flights are performed by the unmanned aerial vehicle (60), wherein at least one orthophoto map and a corresponding digital elevation model (such as $O_1$, $DEM_1$) are generated based on the aerial images obtained during one of the flights.

M53. The method according to any of the preceding embodiments, wherein the area (10) comprises a construction site.

M54. The method according to any of the preceding embodiments, wherein the segmentation step comprises detecting parts (30*a*, 30*b*) of the orthophoto maps that correspond to heap(s) of material and assigning corresponding classes thereto.

M55. The method according to any of the preceding method embodiments with the features of M54, wherein the heap(s) of material comprise a heap of earth.

M56. The method according to any of the preceding method embodiments with the features of M54, wherein the heap(s) of materials comprise a heap of sand.

M57. The method according to any of the preceding embodiments, wherein the segmentation step comprises detecting parts (30*a*, 30*b*) of the orthophoto maps that correspond to tree(s) and assigning corresponding classes thereto.

M58. The method according to any of the preceding embodiments, wherein the segmentation step comprises detecting parts (30*a*, 30*b*) of the orthophoto maps that correspond to roof(s) and assigning corresponding classes thereto.

M59. The method according to any of the preceding embodiments, wherein the segmentation step comprises detecting parts (30*a*, 30*b*) of the orthophoto maps that correspond to water and assigning corresponding classes thereto.

M60. The method according to any of the preceding method embodiments, wherein the method comprises using the system according to any of the system embodiments.

M61. The system according to any of the preceding system embodiments, wherein the system is configured for performing the method according to any of the preceding method embodiments.

S64. The system according to any of the preceding system embodiments, wherein the system is configured for performing the method according to any of the preceding method embodiments.

Below, embodiments of a computer program product will be discussed. These embodiments are abbreviated by the letter "C" followed by a number. Whenever reference is herein made to the "computer program product embodiments", these embodiments are meant.

C1. A computer program product comprising instructions which, when the program is executed by a computer, cause the computer to carry out the steps of the method according to any of the method embodiments.

C2. A computer program product comprising instructions which, when the program is executed by a data-processing system (80), cause the data-processing system (80) to perform the steps for which the data-processing system (80) of the system according to any of the system embodiments is configured.

Exemplary features of the invention are further detailed in the figures and the below description of the figures.

DETAILED FIGURE DESCRIPTION

For the sake of clarity, some features may only be shown in some figures, and others may be omitted. However, also the omitted features may be present, and the shown and discussed features do not need to be present in all embodiments.

Figure 1A:
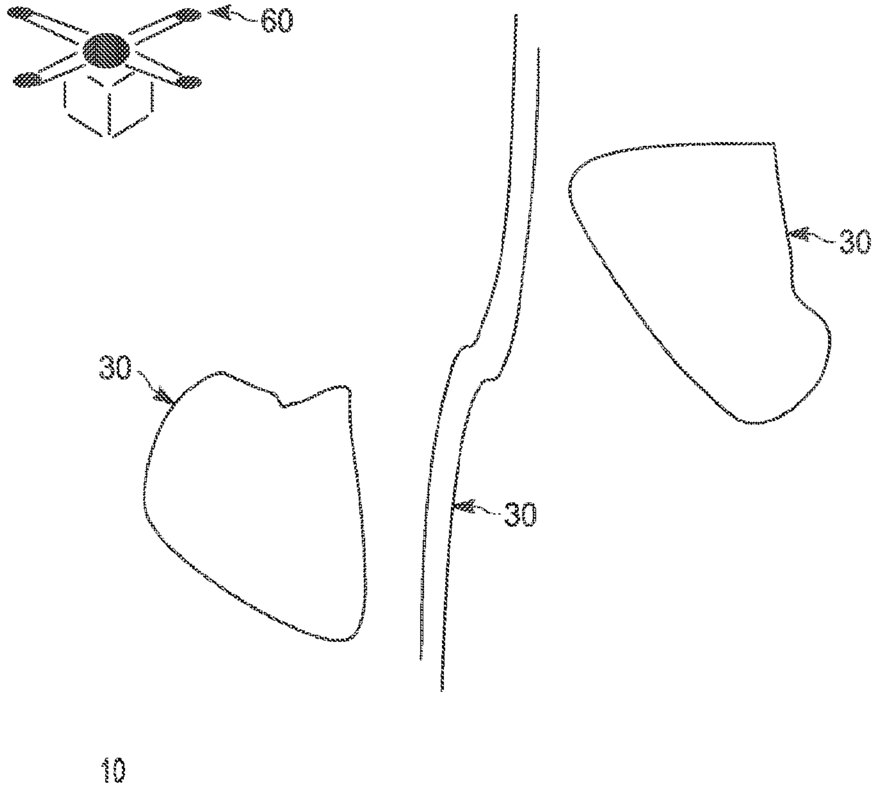
FIG. 1*a* shows an unmanned aerial vehicle over a construction site.

FIG. 1*a* shows an aerial vehicle flying over an area 10, such as a construction site. The aerial vehicle may be an unmanned aerial vehicle 60, which may also be referred to as drone. The aerial vehicle may comprise a multirotor, a fixed-wing and/or a vertical take-off and landing drone. The aerial vehicle may comprise an optical sensor for taking at least two images of the area. The aerial vehicle may further comprise a sensing device configured for sensing a height of the area, e.g. a distance sensor, an altitude sensor and a corresponding processing unit. The aerial vehicle may also comprise components enabling a Real-Time Kinematic (RTK) and a Post-Processing Kinematic (PPK) technology. Both technologies may comprise receiving additional image data from satellites and a stationary ground station.

The area 10 can comprise a construction site. The construction site can be an infrastructure construction site.

The surface of the area can depend, particularly on the structure to be built: In case of a solar farm, the area may have dimensions of about 2 km×2 km, in case of a highway, the area may have dimensions of 10 km×100 m. However, other areas may have other dimensions, e.g. a construction site of a building may have an extent of 300×300 m, or an area comprising still different dimensions.

The spatial resolution of the at least two images may be specified by the Ground Sampling Distance (GSD). The Ground Sampling Distance may correspond to the linear distance between two consecutive portions (e.g. pixels) within an image of the construction site. The distance between the two portions may be estimated based on the center points of the corresponding portions. The Ground Sampling Distance can depend on properties of the optical sensor (e.g. sensor width/diameter, focal length, etc.) and a flight altitude of the aerial vehicle. In this example, the at least two images may each comprise a Ground Sampling Distance between 20 cm-0.5 cm, preferably at most 10 cm-1 cm, and still more preferably between 5 cm and 1 cm.

Based on the images generated by the aerial vehicle 60, at least two orthophoto maps ($O_1$, $O_2$) and at least two digital elevation models ($DEM_1$, $DEM_2$) may be generated.

The at least two orthophoto maps ($O_1$, $O_2$) and the at least two digital elevation models ($DEM_1$, $DEM_2$) or parts thereof may further be processed through a georeferencing method. The georeferencing method may comprise assigning to the at least two orthophoto maps ($O_1$, $O_2$) and digital elevation models ($DEM_1$, $DEM_2$) geographic coordinates of the corresponding area 10. The georeferencing method may further comprise using reference points as a basis for the coordinate transformation. The reference points may comprise Ground Control Points located in the area to which the at least two orthophoto maps ($O_1$, $O_2$) and the at least two digital elevation models ($DEM_1$, $DEM_2$) correspond. The Ground Control Points correspond to points, whose geographic coordinates in the area have already been determined.

The georeferencing method may also be applied on the unprocessed/raw aerial images.

The implementation of GCPs as well as the RTK and PPK technologies may comprise enhancing the positional accuracy of parts of the image and/or the entire image. However, the positional accuracy may change throughout the image, wherein the accuracy may be higher towards the Ground Control Points. For example, the positional uncertainty may range from 1×GSD in the close proximity to the GCPs to being higher than 5×GSD in another location within the image.

Further, FIG. 1*a* shows objects in the area 10. The objects correspond to parts 30 of at least one of the orthophoto maps and the digital elevation models. The objects may for example comprise heaps of sand or other material, or sand. However, the objects may also comprise machinery, materials for construction such as concrete parts or pipes, or an object that is under construction, such as a street, a building or an infrastructure object.

Figure 1B:
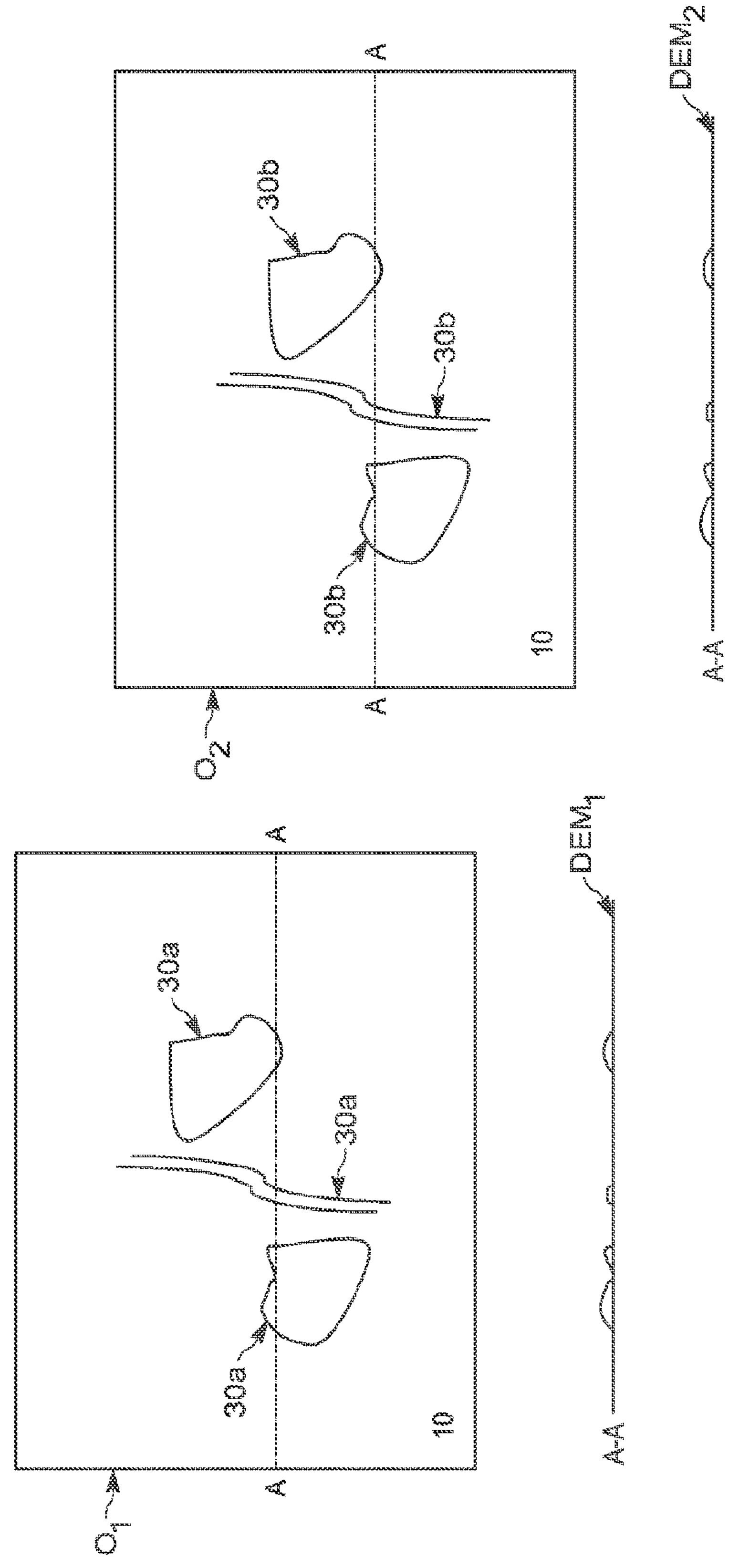
FIG. 1*b* shows two orthophoto maps and two digital elevation models of the construction site.

FIG. 1*b* shows two orthophoto maps ($O_1$, $O_2$) generated based on the at least two images of the area 10. Each orthophoto map ($O_1$, $O_2$) may comprise RGB-data. However, each orthophoto map may also comprise data from different sources, e.g. further comprise infrared data.

FIG. 1*b* further shows a first and a second set of parts, noted as 30*a* and 30*b*, belonging to the first and second input orthophoto map $O_1$ and $O_2$, respectively, as well as to the respective first and second digital elevation model ($DEM_1$ and $DEM_2$). The digital elevation models ($DEM_1$, $DEM_2$) can be generated based on data provided by the unmanned aerial vehicle 60. However, at least one of them can also be provided from another source, e.g. when the initial state is known from prior surveys or was measured by other means. In such a case, the first digital elevation model ($DEM_1$) can be known.

Each of the digital elevation models ($DEM_1$, $DEM_2$) comprises height information for points of the area 10. Thus, it can be interpreted as 3D-map.

Figure 2:
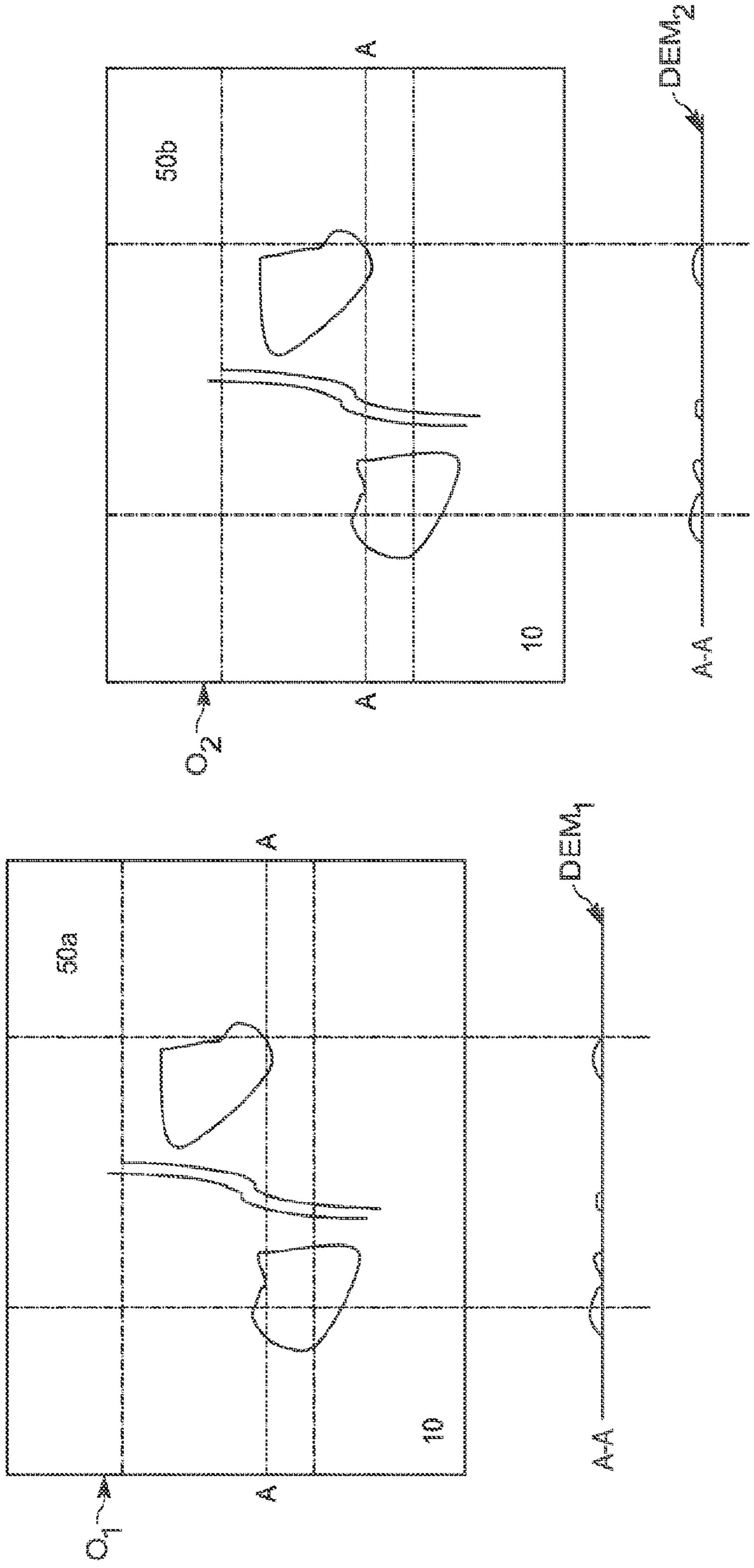
FIG. 2 shows tiles of the two orthophoto maps and the two digital elevation models.

FIG. 1*b* further depicts points in the terrain being associated with different geographic positions in the second orthophoto map $O_2$ and the second digital elevation model DEM2 with respect to $O_1$ and $DEM_1$. In this example, the deviation may correspond to a translational displacement in the entire dataset/image. However, the deviation may also correspond to a rotational displacement. This accounts also for the following figures (FIG. 2, 3, 4, 5, 6). Furthermore, single portions of the orthophoto maps/digital elevation models may be rotated, translated or distorted with respect to each other.

The line A-A in the orthophoto maps in FIG. 1*b* indicates a section through the surface of the area, for which the height coordinates are shown at the lower part of FIG. 1*b*. For each pixel of the line, each digital elevation model comprises a height information.

In other words, each digital elevation model comprises a height information of the surface of the area for each pixel in the x-y-plane.

FIG. 2 shows a first and a second set of tiles. Two tiles are indicated as 50*a* and 50*b*, belonging to the first and second input orthophoto map $O_1$ and $O_2$, respectively, and to the corresponding digital elevation model ($DEM_1$ and $DEM_2$). The tiles may be overlapping in at least one direction.

Figure 3:
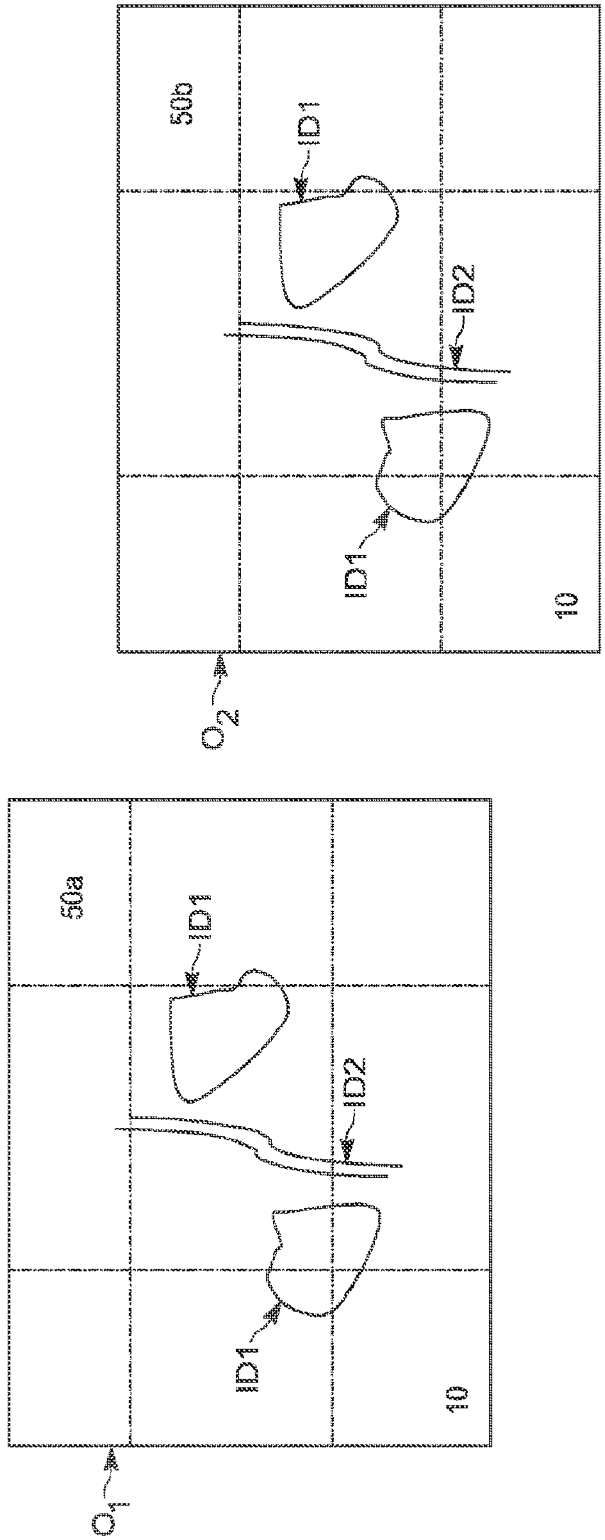
FIG. 3 shows classes assigned to objects located within one or a plurality of tiles on each orthophoto map of the construction site.

FIG. 3 shows classes assigned to individual parts in every set of parts 30*a* and 30*b* in the respective orthophoto map ($O_1$, $O_2$) of the area 10. Each part is located in one or more corresponding tiles of the respective orthophoto map ($O_1$, $O_2$). In the example of FIG. 3, an ID-variable comprises the class information. As can be seen in FIG. 3, generally, the classes may correspond to the class of the object corresponding to a part comprised by the respective set of parts (30*a*, 30*b*). In the example of FIG. 3, there is a heap of sand (ID1), an asphalt object (ID2) and again a heap of sand (ID1) within the orthophoto map $O_1$. The same classes are also assigned to the corresponding objects in the orthophoto map $O_2$.

Figure 4:
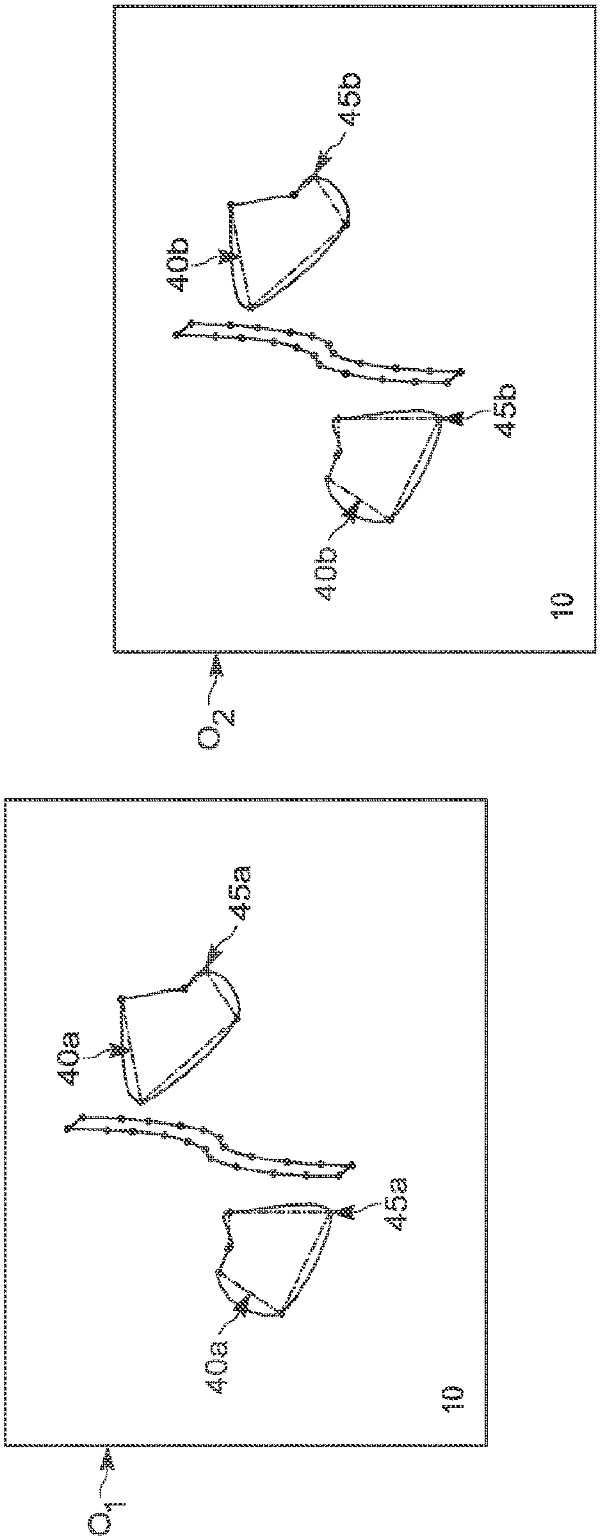
FIG. 4 shows a view of polygons representing the objects located within each orthophoto map of the construction site.

FIG. 4 shows the orthophoto maps ($O_1$, $O_2$) of the area 10, wherein a first and a second set of polygons (40*a*, 40*b*) are shown. Each individual polygon of every set of polygons (40*a*, 40*b*) may approximate or delimit single parts from the respective set of parts (30*a*, 30*b*) of each orthophoto map. Each polygon comprises a plurality of vertices, noted respectively as 45*a* and 45*b*.

The individual polygons of every set of polygons (40*a*, 40*b*) may be 2-dimensional. For example, for the purpose of object segmentation, the first parts 30*a* and the second parts 30*b* of the corresponding orthophoto map of the area 10 may be approximated or delimited by the first polygons 40*a* and the second polygons 40*b*, respectively that are indicated by $x_{a,b}/y_{a,b}$-coordinates of the orthophoto map (or by other two-dimensional coordinates). However, the polygons of every set of polygons (40*a*, 40*b*) may also be 3-dimensional, e.g. the vertices may comprise $x_{a,b}/y_{a,b}/z_{a,b}$-coordinates. Also, the polygons of every set of polygons (40*a*, 40*b*) may be generated as 2-dimensional polygons, and coordinates in a third dimension may be added to the vertices (45*a*, 45*b*), e.g. by projection on the respective digital elevation model ($DEM_1$, $DEM_2$). For example, a minimum, a median or another estimation of the elevation coordinates may then be defined for each set of the vertices 45*a* and 45*b*, respectively and be assigned to the corresponding polygon.

Figure 5:
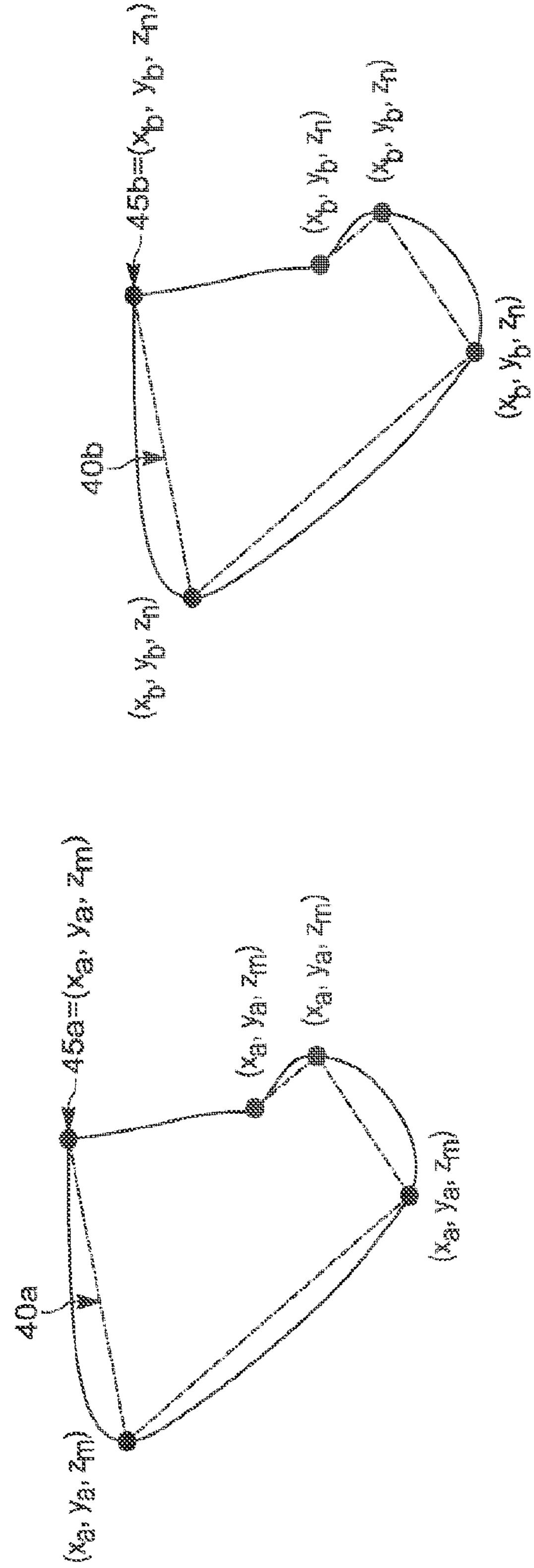
FIG. 5 shows two polygons corresponding to the same object on each orthophoto map.

FIG. 5 shows a first polygon of the first set of polygons 40*a* and a second polygon of the second set of polygons 40*b*, both corresponding to the same object. In the example, each polygon comprises 5 vertices (45*a*, 45*b*). The third, e.g. vertical, coordinate for every vertex (45*a*, 45*b*) of each polygon of the corresponding polygon set is given by the minimum value (or another estimation) of the elevation coordinates $z_a$ and $z_b$, noted as $z_m$ and $z_n$, respectively.

Figure 6:
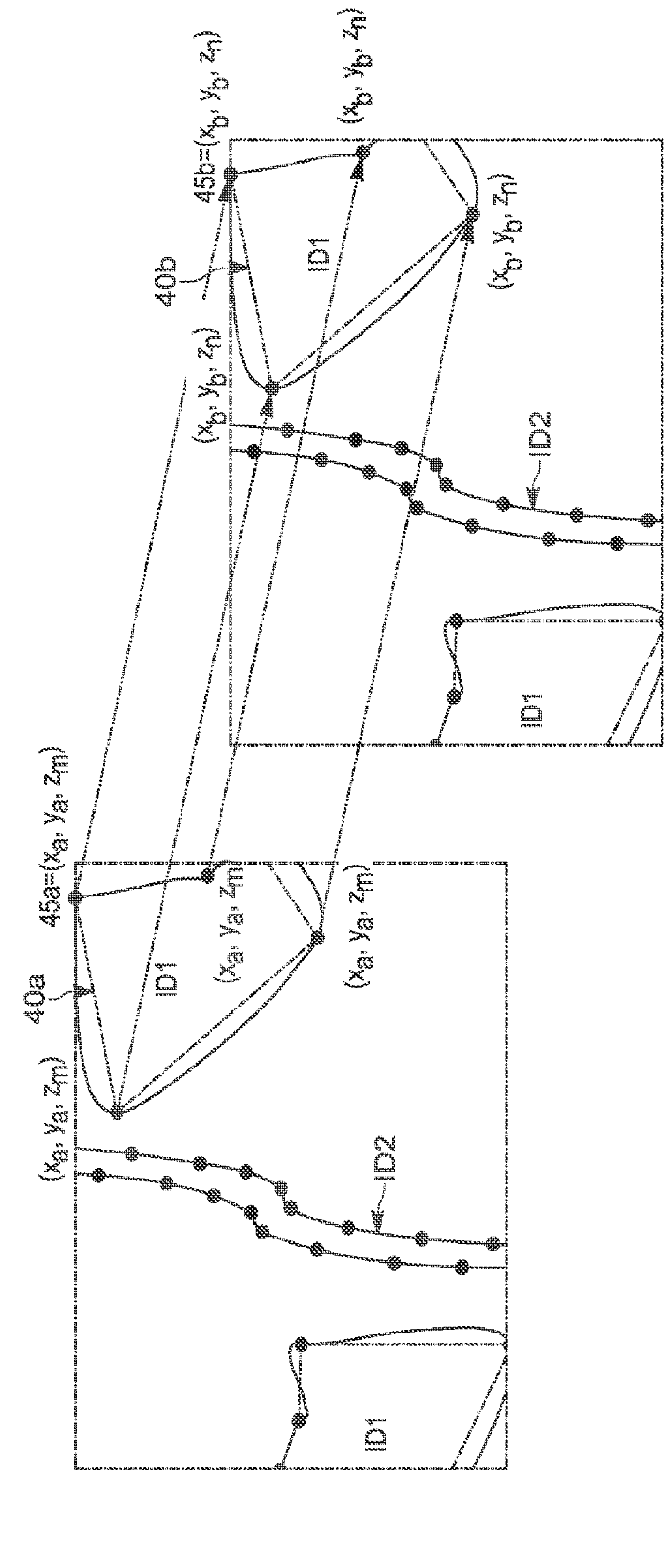
FIG. 6 shows a section of the first and a section of the second orthophoto.

FIG. 6 shows a section of each orthophoto map showing a portion of the area (10). Each section comprises objects of the same classes. This example shows the second polygons (40*b*) to positionally deviate with respect to the first polygons (40*a*). In other words, the vertexes of the second polygons (40*b*) are associated with different geographical coordinates than the vertexes of the first polygons (40*a*).

FIG. 6 further denotes/emphasizes the deviation through alignment vectors between two polygons that correspond to the same object of the class ID1. As an example, one alignment vector is depicted for every pair of vertices (45*a*, 45*b*) of the corresponding first and second polygon(s) (40*a*, 40*b*). The alignment vector is given by following expression:

$$V=(x_a-x_b, y_a-y_b, z_m-z_n)$$

For example, the deviation between two polygons based on at least one pair of vertices in the x-direction is given by the expression $(x_a-x_b)$.

Figure 7:
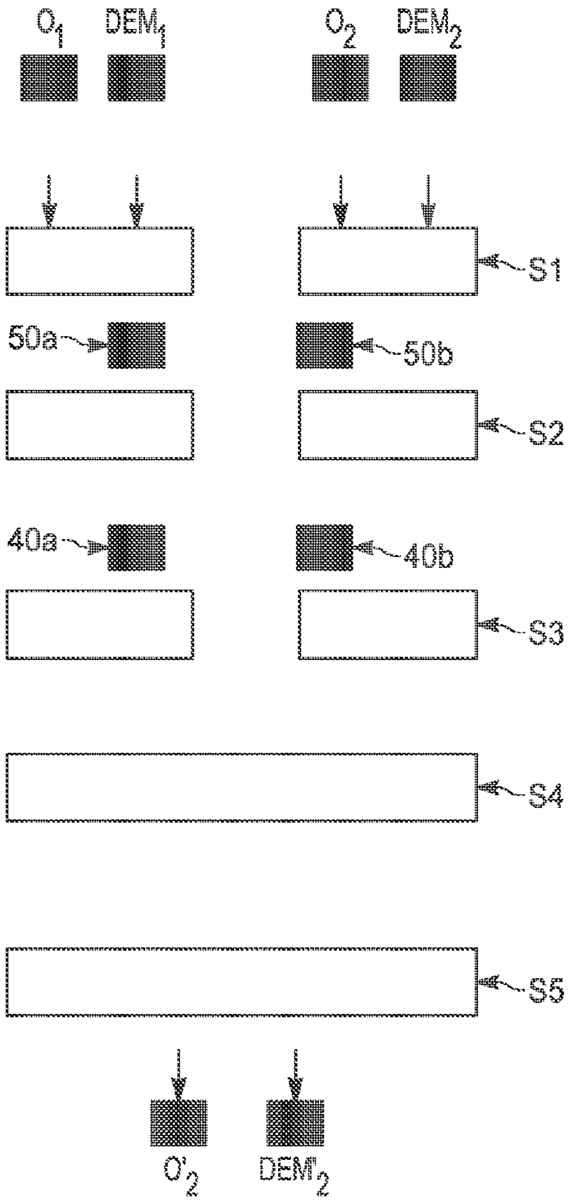
FIG. 7 shows an embodiment of a method.

FIG. 7 shows a method. A system can be configured for performing the method.

The method in FIG. 7 comprises a tile generation step S1, a segmentation step S2, a projection step S3, an error minimizing step S4, and a transformation step S5.

The method depicted in FIG. 7 may comprise processing two orthophoto maps $O_1$, $O_2$, relating to the same area 10 at different points in time. Further, the method comprises processing two digital elevation models $DEM_1$, $DEM_2$, also relating to the area 10 at different points in time. In an example, the first digital elevation model $DEM_1$ may correspond to the time of the first orthophoto map $O_1$, and the second digital elevation model $DEM_2$ may correspond to the time of the second orthophoto map $O_2$.

As mentioned above, the deviation between points of $O_1$ and $O_2$ as well as $DEM_1$ and $DEM_2$ may indicate a translational and/or rotational displacement in the entire dataset/image. Such a deviation may also be present locally; in other words, single portions of the orthophoto maps/digital elevation models may be rotated, translated or distorted with respect to each other. Such a deviation for points in images may be up to cm (in x/y-direction, as well as for height). In order to compare the at least two orthophoto maps $O_1$ and $O_2$ as well as the at least two digital elevation models $DEM_1$ and $DEM_2$, it may be advantageous to normalize the images in order to associate same (physical) points in the area with same coordinates.

The segmentation step may comprise identifying the parts in the orthophoto map ($O_1$, $O_2$) and/or digital elevation model ($DEM_1$, $DEM_2$).

The segmentation step may comprise assigning classes to individual parts in every set of parts 30*a* and 30*b* in the respective orthophoto map ($O_1$, $O_2$) and/or digital elevation model ($DEM_1$, $DEM_2$) of the area 10 by means of at least one convolutional neural network.

The system may be configured for performing the segmentation step.

Exemplary classes may comprise:

background, i.e. no object of interest,
asphalt,
concrete foundation,
concrete ring,
pipe,
tree,
black or dark sand,
cable well,
cars,
chipping,
container,
dump truck,
heap of earth,
heart of sand,
heavy earth equipment,
lantern,
people,
reinforcement,
rubble,
scaffolding,
silo,
water,
wooden boards,
fence,
pavement,
crushed stone for railways, e.g. for track ballast,
concrete grid,
paving blocks,
aggregate, e.g. for generation of electricity or compressed air,
geotextile,
larssen,
artificial rocks,
formwork, retaining wall,
crane,
steel structure,
wall,
roof, and
floor.

The segmentation step may further comprise a tile generation step. The tile generation step may comprise generating a first and a second set of tiles 50*a* and 50*b* within the first and second orthophoto map ($O_1$ and $O_2$), respectively, and the corresponding digital elevation model ($DEM_1$ and $DEM_2$).

The segmentation step may comprise determining a first set of polygons 40*a* based on the first orthophoto map $O_1$ and/or the first digital elevation model ($DEM_1$) as well as a second set of polygons 40*b* based on the second orthophoto map $O_2$ and/or the second digital elevation model ($DEM_2$).

The projection step may then be performed for at least one polygon of the first set of polygons 40*a* and the first digital elevation model $DEM_1$, and for at least one polygon of the second set of polygons 40*b* and the second digital elevation model $DEM_2$.

The projection step may comprise generating 3D-coordinates for the vertices 45*a* of at least one polygon belonging to the first set of polygons 40*a* as well as generating 3D-coordinates for the vertices 45*b* of at least one polygon belonging to the second set of polygons 40*b*.

The projection step may also comprise projecting the vertices 45*a* of at least one polygon of the first set of polygons 40*a* on the first digital elevation model $DEM_1$ as well as projecting the vertices 45*b* of at least one polygon of the second set of polygons 40*b* on the second digital elevation model $DEM_2$.

In other words, the projection step may also comprise determining elevation coordinates of the corresponding digital elevation model at points corresponding to the vertices 45*a* and 45*b* of the polygons of the respective set of polygons (40*a*, 40*b*).

In an example, the method in FIG. 7 comprises determining a minimum value (or another estimation) of the elevation coordinates of the vertices 45*a* of at least one polygon of the first set of polygons 40*a* as well as determining a minimum value (or another estimation) of the elevation coordinates of the vertices 45*b*. The resulting polygon(s) in the first and the second set of polygons may then be 3-dimensional, e.g. the vertices may comprise $x_{a,b}/y_{a,b}/z_{m,n}$-coordinates. In this example, $z_m$ and $z_n$ refer to the minimum values of the respective elevation coordinates $z_a$ and $z_b$, as discussed above.

The error minimizing step may comprise applying a machine learning algorithm for a plurality of objects of the same class of the at least two orthophoto maps. The machine learning algorithm may comprise assigning to a first object in the first orthophoto map $O_1$ a corresponding object of the same class in the second orthophoto map $O_2$, based on measures such as distribution, clustering, and distance between the objects of the corresponding orthophoto maps. In this example, the machine learning algorithm performs a nearest neighbour analysis step. The nearest neighbour analysis step may comprise estimating the distance between a reference point (such as a centroid) of the first object of $O_1$ and reference points, such as centroids, of every object of the same class of $O_2$. This may also comprise generating candidate matching pairs of objects of the respective two orthophoto maps ($O_1$, $O_2$) based on a similarity measure. The similarity measure may refer to geometric similarities between the objects of the pairs, such as shape, size and dimensions. The nearest neighbour analysis step may further comprise selecting as a matching counterpart to the first object of $O_1$, a second object of $O_2$ of the same class, wherein the reference point of the second object has the smallest distance to the reference point of the first object of $O_1$. FIG. 6 shows as an example a matching pair of polygons that are both classified as heaps of sand (ID1) by means of at least one convolutional neural network and correspond to the same object based on the nearest neighbour analysis.

Further, the error minimizing step may comprise estimating at least one or a plurality of alignment vectors for at least one pair of a first (40*a*) and a second polygon (40*b*) corresponding to the same object. For example, a plurality of alignment vectors is each calculated based on one pair of vertices (45*a*, 45*b*) of the corresponding first and second polygon(s) (40*a*, 40*b*). However, an alignment vector may also be calculated based on reference points (such as centroids) estimated for the corresponding first and second polygon(s) (40*a*, 40*b*).

This may allow to identify deviations for a plurality of pairs of first (40*a*) and second polygons (40*b*), wherein the polygons of each pair correspond to the same object.

Thus, optionally advantageously, positional deviations can be detected and reduced.

The error minimizing step may further comprise finding an optimal transformation between the coordinates $x_a$, $y_a$, $z_m$ and $x_b$, $y_b$, $z_n$ by means of an optimization algorithm.

The transformation step may comprise transforming the second orthophoto map $O_2$ and the second digital elevation model $DEM_2$ based on the transformation determined by the error minimizing step. The transformation may be for example a linear or an affine transformation.

Further, the transformation step may comprise generating a transformed second orthophoto map $O_2'$ and a transformed second digital elevation model $DEM_2'$, where the corresponding polygons of $O_2'$ and $DEM_2'$ are positionally re-aligned based on the alignment vectors mentioned above.

The tile generation step S1, the segmentation step S2, and the projection step S3 are steps that can also be applied on a single orthophoto map O and a single digital elevation model DEM.

Figure 8:
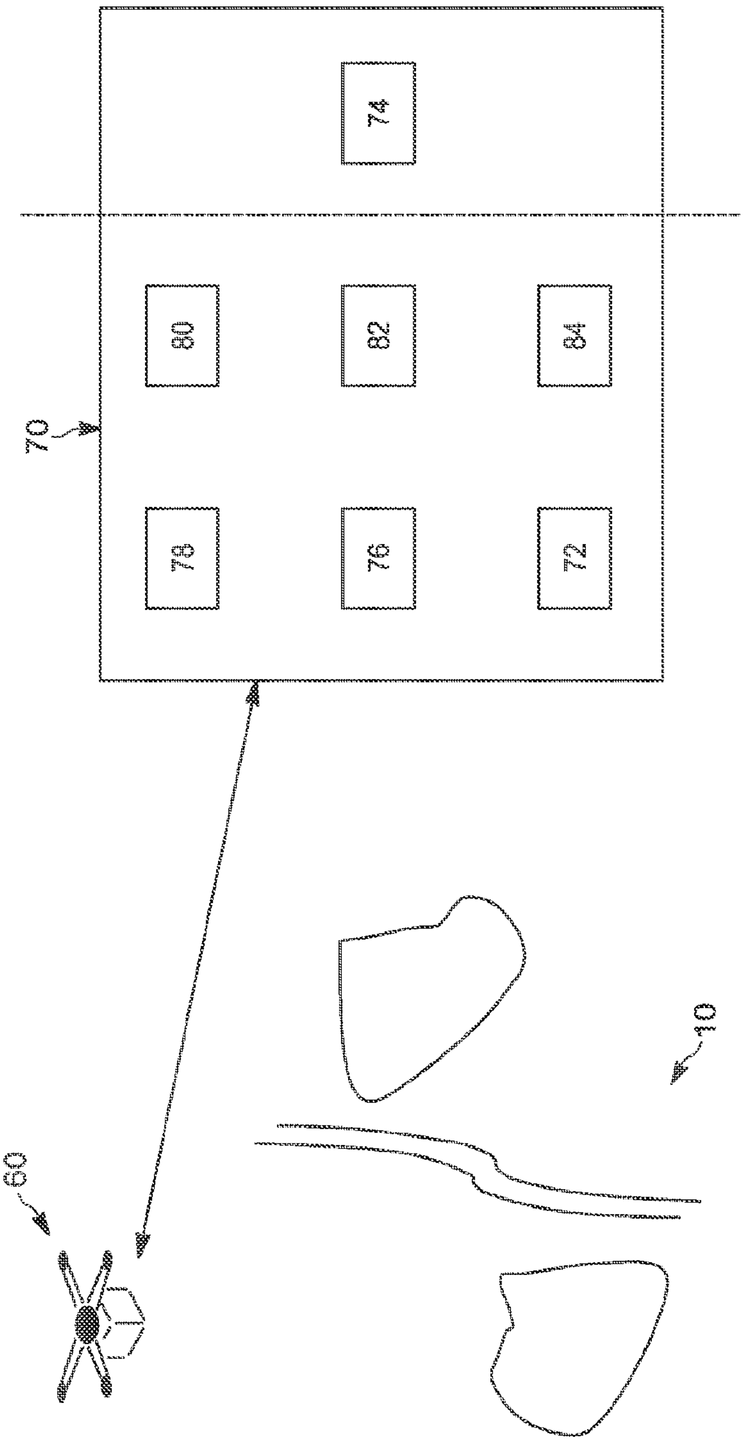
FIG. 8 shows a system configured for performing the method.

FIG. 8 shows a system. The system may be configured for performing the method.

The system comprises a data-processing system 70.

The data processing system 70 may comprise one or more processing units configured to carry out computer instructions of a program (i.e. machine readable and executable instructions). The processing unit(s) may be singular or plural. For example, the data processing system 70 may comprise at least one of CPU, GPU, DSP, APU, ASIC, ASIP or FPGA.

The data processing system 70 may comprise memory components, such as the data storage component 72. The data storage component 72 as well as the data processing system 70 may comprise at least one of main memory (e.g. RAM), cache memory (e.g. SRAM) and/or secondary memory (e.g. HDD, SDD).

The data processing system 70 may comprise volatile and/or non-volatile memory such an SDRAM, DRAM, SRAM, Flash Memory, MRAM, F-RAM, or P-RAM. The data processing system 70 may comprise internal communication interfaces (e.g. busses) configured to facilitate electronic data exchange between components of the data processing system 70, such as, the communication between the memory components and the processing components.

The data processing system 70 may comprise external communication interfaces configured to facilitate electronic data exchange between the data processing system and devices or networks external to the data processing system, e.g. for receiving data from the unmanned aerial vehicle 60.

For example, the data processing system may comprise network interface card(s) that may be configured to connect the data processing system to a network, such as, to the Internet. The data processing system may be configured to transfer electronic data using a standardized communication protocol. The data processing system may be a centralized or distributed computing system.

The data processing system may comprise user interfaces, such as an output user interface and/or an input user interface. For example, the output user interface may comprise screens and/or monitors configured to display visual data (e.g. an orthophoto map (O) of the area 10) or speakers configured to communicate audio data (e.g. playing audio data to the user). The input user interface may e.g. a keyboard configured to allow the insertion of text and/or other keyboard commands (e.g. allowing the user to enter instructions to the unmanned aerial vehicle or parameters for the method) and/or a trackpad, mouse, touchscreen and/or joystick, e.g. configured for navigating the orthophoto map O or objects identified in the orthophoto map.

To put it simply, the data processing system 70 may be a processing unit configured to carry out instructions of a program. The data processing system 70 may be a system-on-chip comprising processing units, memory components and busses. The data processing system 70 may be a personal computer, a laptop, a pocket computer, a smartphone, a tablet computer. The data processing system may comprise a server, a server system, a portion of a cloud computing system or a system emulating a server, such as a server system with an appropriate software for running a virtual machine. The data processing system may be a processing unit or a system-on-chip that may be interfaced with a personal computer, a laptop, a pocket computer, a smartphone, a tablet computer and/or user interfaces (such as the upper-mentioned user interfaces).

In the example of FIG. 8, the data-processing system comprises a portion located in a cloud system (the segmentation component 74 comprising the convolutional neural network—shown on the right of the dashed line in FIG. 8) and a portion located on a computer system, such as a server (shown on the left of the dashed line in FIG. 8). This may be optionally advantageous, as training and evaluating a neural network may be particularly demanding in terms of computing power. This computing power may be provided efficiently by means of a cloud-computing system.

In the example of FIG. 8, the data-processing system comprises a segmentation component 74 configured for performing the semantic segmentation step.

In other words, the data processing system 70 may comprise a segmentation component 74. More particularly, the data processing system 70 may comprise at least one storage device wherein the data processing system 70 may be stored.

The segmentation component 74 may be implemented in software. Thus, the segmentation component 74 may be a software component, or at least a portion of one or more software components. The data processing system 70 may be configured for running said software component, and/or for running a software comprising this software component. In other words, the segmentation component 74 may comprise one or more computer instructions (i.e. machine-readable instructions) which may be executed by a computer (e.g. the data processing system 70).

The segmentation component 74 may be stored on one or more different storage devices. For example, the segmentation component 74 may be stored on a plurality of storage components comprising persistent memory, for example a plurality of storage devices in a RAID-system, or different types of memory, such as persistent memory (e.g. HDD, SDD, flash memory) and main memory (e.g. RAM).

The segmentation component 74 may also be implemented at least partially in hardware. For example, the segmentation component 74 or at least a portion of the segmentation component 74 may be implemented as a programmed and/or customized processing unit, hardware accelerator, or a system-on-chip that may be interfaced with the data processing system 70, a personal computer, a laptop, a pocket computer, a smartphone, a tablet computer and/or a server.

The segmentation component 74 may also comprise elements implemented in hardware and elements implemented in software. An example may be a use of a hardware-implemented encryption/decryption unit and a software implemented processing of the decrypted data.

The segmentation component 74 may comprise elements specific to the data processing system 70, for example relating to an operating system, other components of the data processing system 70, or the unmanned aerial vehicle 60 to which the data processing system 70 may be connected.

Further, data processing system 70 may comprise a projection component 76. The projection component 78 may be configured for performing the projection step. More particularly, the data processing system 70 may comprise at least one storage device wherein the projection component 76 may be stored.

The data processing system 70 may comprise an error minimizing component 78. The error minimizing component 78 may be configured for performing the error minimizing step.

Also, the data processing system 70 may comprise a transformation component 80. The transformation component 80 may be configured for performing the transformation step.

Also, the data processing system 70 may comprise a pre-processing component 82. The pre-processing component 82 may be configured for performing the pre-processing step.

The data processing system 70 may comprise a post-processing component 84. The post-processing component 84 may be configured for performing the post-processing step.

The data processing system 70 may comprise at least one storage device wherein at least one of the projection component 76, the error minimizing component 78, the transformation component 80, the pre-processing step 82 and the post-processing component 84 may be stored, such as the data-storage component 72.

At least one of the projection component 76, the error minimizing component 78, the transformation component 80, the pre-processing component 82 and the post-processing component 84 may be implemented in software. One, some or all of these components may be a software component, or at least a portion of one or more software components. The data processing system 70 may be configured for running said software components, and/or for running a software comprising the software components. In other words, the components may comprise one or more computer instructions (i.e. machine-readable instructions) which may be executed by a computer (e.g. the data processing system 70).

At least one of the projection component 76, the error minimizing component 78, the transformation component 80, the pre-processing component 82 and the post-processing component 84 may be stored on one or more different storage devices. For example, the at least one of the components may be stored on a plurality of storage components comprising persistent memory, for example a plurality of storage devices in a RAID-system, or different types of memory, such as persistent memory (e.g. HDD, SDD, flash memory) and main memory (e.g. RAM).

The components may also be implemented at least partially in hardware. For example, at least one of the projection component 76, the error minimizing component 78, the transformation component 80, the pre-processing component 82 and the post-processing component 84 or at a part of one of their functionalities may be implemented as a programmed and/or customized processing unit, hardware accelerator, or a system-on-chip that may be interfaced with the data processing system 70, a personal computer, a laptop, a pocket computer, a smartphone, a tablet computer and/or a server.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

REFERENCE SIGNS

O orthophoto map
$O_1$ first orthophoto map
$O_2$ second orthophoto map
DEM digital elevation model
$DEM_1$ first digital elevation model
$DEM_2$ second digital elevation model
10 area
20 design data
30 part
40 polygon
40*a* first polygon
40*b* second polygon
45*a* vertex of the first polygon
45*b* vertex of the second polygon
50*a* first tile
50*b* second tile
60 unmanned aerial vehicle
70 data-processing system
72 data-storage component
74 segmentation component
76 projection component
78 error minimizing component
80 transformation component
82 pre-processing component
84 post-processing component
S1 Tile generation step
S2 Segmentation step
S3 Projection step
S4 Error minimizing step
S5 Transformation step

The invention claimed is:

1. A system configured for analysis of aerial images, comprising a data-processing system, the data-processing system comprising at least one processor and at least one memory, the processor and/or the memory being configured to realize a data-processing storage component, a segmentation component, a projection component and an error minimizing component, wherein the data-processing storage component is configured for providing at least two input orthophoto maps and at least two input digital elevation models relating to an area, wherein each orthophoto map provides an orthogonal visualization of an area that allows to measure true distances and wherein the at least two input orthophoto maps and/or the at least two input digital elevation models relate to the same area at different points in time, wherein the segmentation component is configured for generating at least one or a plurality of polygon(s) for the at least two orthophoto maps relating to the area, each polygon approximating a part of the corresponding input orthophoto map, wherein the segmentation component is configured for generating the polygon(s) based on the at least two input orthophoto maps, wherein the segmentation component is configured for assigning different classes to different portions of the at least two orthophoto maps, wherein the segmentation component is configured for assigning portions comprising same classes to groups, wherein the segmentation component is further configured for determining the polygon(s) based on the determined groups, and wherein the error minimizing component is configured for minimizing positional errors on at least one or a plurality of parts of the at least two orthophoto maps.

2. The system according to claim 1, wherein the projection component is configured for projecting the polygon(s) on the corresponding input digital elevation model of the area.

3. The system according to claim 1, wherein the projection component is configured for determining for each vertex of the corresponding polygon(s) at least one coordinate corresponding to the projection of vertices on the corresponding input digital elevation model and a reference value for each projection of the vertices of each polygon to the digital elevation models.

4. The system according to claim 1, wherein the error minimizing component is configured for applying a machine learning algorithm, wherein the machine learning algorithm is configured for performing a nearest neighbour analysis step, wherein the nearest neighbour analysis step comprises assigning to at least one object of one of the orthophoto maps a corresponding object of the same class in one of the other orthophoto maps.

5. The system according to claim 1, wherein the data-processing system is further configured for providing object-class data indicating at least one or a plurality of object-class(es), and wherein the error minimizing component is further configured for determining a transformation for a plurality of pairs of corresponding parts of at least one of the indicated object-class(es) of the at least two orthophoto maps by means of an optimization algorithm.

6. The system according to claim 5, wherein the processor and/or the memory are configured to realize a transformation component, wherein the transformation component is configured for transforming at least one orthophoto map and at least one digital elevation model based on the transformation determined by the error minimizing component.

7. The system according to claim 1, wherein the segmentation component is configured for determining classes for at least some of the part(s) of the at least two orthophoto maps by means of at least one convolutional neural network.

8. The system according to claim 7, wherein the processor and/or the memory are configured to realize a post-processing component, wherein the post-processing component is configured for assigning a first class to a connected plurality of portions to which no class is assigned, if the connected plurality is enclosed by connected portions to which the first class is assigned and for removing excessive vertices of the polygon(s).

9. A computer-implemented method for transforming photogrammetric data, comprising:

performing an input data providing step comprising providing at least two input orthophoto maps and at least two digital elevation models relating to an area, wherein each orthophoto map provides an orthogonal visualization of an area that allows to measure true distances and wherein the at least two input orthophoto maps and/or the at least two input digital elevation models relate to the same area at different points in time;

performing a segmentation step, wherein the segmentation step comprises generating at least one or a plurality of polygon(s) for the at least two orthophoto maps ($O_1$ and $O_2$) based on the at least two input orthophoto maps;

assigning different classes to different portions of the at least two orthophoto maps;

assigning portions comprising same classes to groups;

determining the polygon(s) based on the determined groups; and performing an error minimizing step on at least one or a plurality of parts on the at least two orthophoto maps.

10. The method according to the claim 9, wherein the method further comprises a projection step, wherein the projection step comprises projecting the polygon(s) on the corresponding input digital elevation model(s) of the area.

11. The method according to claim 10, wherein the projection step comprises determining for each vertex of the polygon(s) at least one coordinate corresponding to a projection of the respective vertex on the corresponding input digital elevation model.

12. The method according to claim 9, wherein the method further comprises providing object-class data indicating at least one or a plurality of object-class(es), and wherein the error minimizing step comprises determining a transformation for a plurality of pairs of corresponding parts of at least one of the indicated object-class(es) of the at least two orthophoto maps by means of an optimization algorithm.

13. The method according to claim 12, wherein the method further comprises a transformation step comprising transforming at least one orthophoto map (such as $O_2$) and at least one digital elevation model (such as $DEM_2$) based on the transformation determined by the error minimizing step.

14. The method according to claim 9, wherein the segmentation step comprises determining classes for at least some of the part(s) of the at least two orthophoto maps by means of at least one convolutional neural network.

15. The method according to claim 14, wherein the segmentation step comprises a post-processing step, wherein the post-processing step comprises for a connected plurality of portions to which no class is assigned, assigning a first class, if the connected plurality is enclosed by connected portions to which the first class is assigned.

16. A non-transitory computer-readable storage medium storing instructions which, when executed by a processor of a computer, cause the computer to carry out the steps of the method according to claim 9.

17. The system according to claim 1, wherein each part of the at least two orthophoto maps corresponds to an object in the area.

18. The system according to claim 4, wherein the error minimizing component is further configured for estimating the distance between a reference point, such as a centroid, of the at least one object of one of the orthophoto maps and reference points, such as centroids, of every object of the same class of the one of the other orthophoto maps.

19. The system according to claim 4, wherein the error minimizing component is configured for generating candidate matching pairs of objects of the at least two orthophoto maps based on a similarity measure, and wherein the error minimizing component is further configured for selecting a matching pair of objects of the same class of the at least two orthophoto maps, wherein reference points of the objects of the matching pair are most similar to each other.

* * * * *